US007909137B2

(12) United States Patent
Green

(10) Patent No.: US 7,909,137 B2
(45) Date of Patent: Mar. 22, 2011

(54) SUPPORT HARNESS

(75) Inventor: Sherry Jean Green, Jasper, GA (US)

(73) Assignee: Trophyline, LLC, Jasper, GA (US)

( * ) Notice: Subject to any disclaimer, the term of this patent is extended or adjusted under 35 U.S.C. 154(b) by 841 days.

(21) Appl. No.: 11/323,902

(22) Filed: Dec. 30, 2005

(65) Prior Publication Data

US 2006/0169534 A1 Aug. 3, 2006

Related U.S. Application Data

(63) Continuation-in-part of application No. 10/992,990, filed on Nov. 19, 2004, now Pat. No. 7,063,185, which is a continuation-in-part of application No. 10/463,641, filed on Jun. 17, 2003, now Pat. No. 7,051,836.

(60) Provisional application No. 60/390,801, filed on Jun. 20, 2002.

(51) Int. Cl.
*A62B 35/00* (2006.01)
(52) U.S. Cl. .......................................................... 182/3
(58) Field of Classification Search ................... 182/3
See application file for complete search history.

(56) References Cited

U.S. PATENT DOCUMENTS

| 1,636,459 | A | | 7/1927 | Chappel | |
|---|---|---|---|---|---|
| 3,444,957 | A | * | 5/1969 | Ervin, Jr ............................ | 182/3 |
| 3,448,826 | A | | 6/1969 | Rosenblum | |
| 3,757,893 | A | | 9/1973 | Hobbs | |
| 4,197,816 | A | | 4/1980 | Lusch | |
| 4,446,943 | A | | 5/1984 | Murray | |
| 4,687,074 | A | | 8/1987 | Green | |
| 4,991,689 | A | | 2/1991 | Cole | |
| 5,090,503 | A | * | 2/1992 | Bell .................................. | 182/5 |
| 5,113,981 | A | * | 5/1992 | Lantz ............................ | 188/371 |
| 5,136,724 | A | | 8/1992 | Grilliot et al. | |
| 5,174,410 | A | * | 12/1992 | Casebolt .......................... | 182/3 |
| 5,183,007 | A | | 2/1993 | Vincent | |
| 6,128,782 | A | | 10/2000 | Young et al. | |
| 6,213,365 | B1 | | 4/2001 | Stocke et al. | |
| 6,223,854 | B1 | | 5/2001 | Nolz | |
| 6,299,040 | B1 | * | 10/2001 | Matias .......................... | 224/254 |
| 6,533,066 | B1 | * | 3/2003 | O'Dell ............................ | 182/3 |
| 2006/0027277 | A1 | * | 2/2006 | Jennings et al. ............. | 139/408 |

* cited by examiner

*Primary Examiner* — Alvin C Chin-Shue
(74) *Attorney, Agent, or Firm* — David L King

(57) ABSTRACT

A harness system for supporting a person off of a ground surface. The harness system may include a seat supported by a strap attached to the seat. The strap may form one or more leg containing loops for keeping a person securely positioned in the harness. The harness may also include a climbing strap for securing the harness loosely to a support device, such as a tree, while a person climbs a support device. The harness may be secured to a person by tightening a waist strap around the person's waist. The harness system may include a fall restraint device and should straps enabling the harness system to qualify as a fall arrest system.

9 Claims, 15 Drawing Sheets

SUPPORT HARNESS

CROSS-REFERENCE TO RELATED APPLICATION

This application is a continuation-in-part of U.S. Utility patent application Ser. No. 10/992,990, filed, Nov. 19, 2004, which is a continuation-in-part of U.S. Utility patent application Ser. No. 10/463,641, filed Jun. 17, 2003, which claims the benefit of U.S. Provisional Application No. 60/390,801, filed Jun. 20, 2002.

FIELD OF THE INVENTION

The invention is directed generally to harnesses, and more particularly, to harnesses for suspending a person from a tree, tree limb, or other structure in a safe and comfortable manner.

BACKGROUND

Big-game hunting is a popular recreational activity pursued by hunters in many parts of the United States, Canada and else where in the world. Big-game animals typically include animals such as, but not limited to, elk, whitetail deer, blacktail deer, mule deer, wild hog, javelina, black bear, and brown bear. Many of these animals have a good sense smell and some have good eyesight. A popular method of harvesting many of these animals is by using a tree stand. A tree stand is a device that allows a hunter to remain motionless for many hours while being suspended above the ground anywhere between 10 feet to 50 feet above the ground. Tree stands may be found in many configurations. For instance, tree stands may be permanently attached to a tree and built from pressure treated lumber in a configuration dictated by the shape of a tree, but generally including a seat and platform. Tree stands may also be portable. Portable tree stands include ladder stands, climbing stands and hanging or lock-on tree stands. Typically portable tree stands are made of metal, such as aluminum or steel.

Yet another portable tree stand that has gained acceptance by hunters is a tree harness, as shown in U.S. Pat. No. 4,687,074, referred to as the '074 patent. The '074 patent discloses a tree harness having a flexible seat for supporting a person in a tree above the ground. The flexible seat, which is typically made of leather, fits around the buttocks and hips of a person. The seat is secured in place with a waist strap that is adjustable using a fastener, but only after disconnecting the fastener. The seat and person are supported by an adjustable support strap having a first end that loops around a portion of a tree, such as a limb or trunk, and a second end that loops around the waist strap used to secure the seat to a person. The adjustable support strap is secured to itself using a releasable hook.

The tree harness disclosed in the '074 patent accomplished the objective of suspending a person in a tree in such a position to allow the person to operate a firearm such as a rifle or bow and arrow. However, the tree harness of the '074 patent is difficult and unsafe to adjust while a person is seated in the tree harness and suspended from a tree. For instance, the tree harness provides no manner for securing the person to the tree while the person is connecting the adjustable support strap to a tree trunk or limb or while the person is climbing a tree. Furthermore, the waist strap may not be adjusted while a person is seated in the tree harness and suspended from a tree without first disconnecting the fastener in the waist strap and having the person lift himself from the seat by standing on a step or branch. Opening the fastener in the waist strap while suspended from a tree at any height is dangerous because there exists the possibility that the person could fall from the tree harness. In addition, the adjustable support strap that is wrapped around the tree and supports the seat may only be adjusted by removing the releasable clip from the adjustable support strap, which may only be accomplished by completely removing all weight from the adjustable support strap. Thus, the person must stand on a limb, step, or other item to accomplish this task. This is a very dangerous feat while hunting from a tree because the user must first properly secure a firearm and then must balance on a limb while attempting to disconnect the releasable clip, insert the releasable clip into a different hole, and reestablish a position in the seat without falling from the tree. Under most conditions this cannot be accomplished in a safe manner. In addition, the tree harness also includes pockets that are permanently attached to the tree harness. Such pouches are not adjustable and thus, are often unable to meet the needs of all hunters.

Therefore, there exists a need for a harness including safety features allowing a person to safely adjust various straps in a safe manner while being suspended off of the ground to obtain a comfortable position in the harness. In addition, there is a need for a harness system that enables hunters to customize the harness to meet the needs of the hunter.

SUMMARY OF THE INVENTION

This invention is directed to a harness capable of supporting a person off of a ground surface by hanging from a support object. In at least one embodiment of this invention, a harness supports a person from a tree in a position enabling the person to safely and effectively operate a firearm. In addition, the harness may be used for other uses including, but not limited to, harnesses for firefighters and other rescue personnel, tree pruners, utility workers performing work on power or other type utility poles, for repelling, such as by high rise window washers, and by other people needing to be safely suspended off of the ground.

The harness may include a seat that is supported by a hanging strap. The hanging strap may be coupled to a support object, which may be, but is not limited to a tree trunk, tree limb, pole or other object. The seat may be flexible and may support a person by cradling the buttocks and hips of the person. The seat may have a first top corner, a second top corner, a first side edge, and a second side edge opposite from the first side edge. The periphery of the seat may be reinforced with a strap that is configured to form two leg containing loops through which a person using the harness places his or her legs. In one embodiment, a first leg containing loop may be coupled to a first side edge, and a second leg containing loop may be coupled to a second side edge. The leg containing loops support the weight of the person in an emergency situation where the person has begun to fall from the harness. Otherwise, the leg containing loops do not support any weight. The ends of the strap may be coupled together in a single connection using a "WW" stitching pattern for maximum strength. One or more pouches may be coupled to the flexible seat in a modular fashion for storing various items for hunting, tree pruning, repelling, rescue operations, firefighting operations and the like. These pockets may be attached to the backside of the seat and may have a closure member for securing the contents of the pockets. The modular configuration of the pockets enables a user to customize the harness for a particular application.

The harness may include a climbing strap for connecting a person to a support object while the person is climbing the support object. The climbing strap may be formed from a first strap including a releasable hook, and a second strap including a fastener. The first and second straps may be wrapped around a support object and coupled together to keep the person from falling away from the support object while the person is climbing the tree and while the person is attaching the hanging strap to the support object. The climbing strap may be tightened around the support object by pulling a loose end of the second strap. The climbing strap include fasteners for tightening the climbing strap that may be located on either the first or second straps forming the climbing strap. The climbing strap need not be disconnected to be tightened. In another embodiment, the climbing strap may be adjusted by placing the attachment hardware through adjustment holes. The adjustment holes may be in one or both sides of the climbing belt. The adjustment holes prevent the possibility of the hook from becoming disengaged.

The harness may include a waist strap for coupling the seat of the harness to the hanging strap and for pulling the two sides of the harness together around the waist of a person. The waist strap may extend between the first top corner and the second top corner of the seat. The waist strap may include a top strap section and a bottom strap section. The waist strap may be tightened around a person's waist by pulling on the top strap section, which causes the bottom strap section and the periphery of the seat to tighten around the waist of the person and forms slack in the top waist strap. While the waist strap is adjustable, it may not be taken apart to form two separate straps. Rather, the waist strap is adjusted by pulling one side of the top or bottom strap section through the fastener. The slack formed in the top strap section is used to connect the harness to a support object using a hanging strap. Using the harness in this manner created a two point harness system. In an alternative embodiment, the top and bottom strap sections are adjusted to have generally even lengths. The loop formed by the top and bottom strap sections collectively may receive a hanging strap to support the harness using two interlocking loops. In yet another embodiment, the waist strap may be formed from a single, nonadjustable strap.

The hanging strap may be any strap capable of supporting the average weight of a person, but in the interest of safety, should be able to support 500 pounds or more. The hanging strap may include a releasable hook and a fastener capable of receiving the releasable hook. The hanging strap supports the weight of a person and is used to couple the harness to a support object. The hanging strap may be attached to a support object in many ways. In one embodiment, the hanging strap is attached to a support object by wrapping the strap around the support object one or more times and tying the end of the hanging strap having the releasable hook around the hanging strap. In this configuration, the releasable hook hangs over the portion of the hanging strap wrapped around the support object and hangs about 6 to about 16 inches beneath the tied portion of the hanging strap. The fastener may then be feed through the loop formed by the top strap section of the waist strap and attached to the releasable hook on the hanging strap. In the alternative embodiment, the fastener may be feed through the loop formed by the top and bottom strap sections collectively to form two interlocking loops. The person may then sit in the seat and be supported by the hanging strap.

This configuration forms two interlocking loops that are capable of rotating freely within each other. Specifically, both the hanging strap and the top strap section of the waist strap form loops. The interlocking loops are advantageous because the loops enable a person seated in the harness to move easily in relation to the support object.

The height of the seat when the harness is supported by the hanging strap may also be adjusted using the waist strap without disconnecting the hanging strap from the loop formed by the top strap section. Rather, the height of the seat may be adjusted using the fastener, which may be referred to as an adjuster buckle, while the hanging strap remains attached to the waist strap and to a tree or other object, thereby eliminating the possibility of the person falling from the tree while adjusting the height of the seat.

The harness may also include a shoulder harness. The shoulder harness may be capable of supporting the harness while the harness is attached to a user or may prevent a user from falling out of the harness. The shoulder harness may have a general Y-shaped configuration and a fastener for adjusting the length of the shoulder harness. The shoulder harness may have an adjustable fastener along the shoulder strap positioned proximate to a back of a user so as to not interfere with various tasks to be conducted by a user. In another embodiment, the shoulder harness may be integrated in a vest-type configuration attached to the seat of the harness or waist strap.

The harness system may also include one or more modular pouches. The modular pouches may be releasably coupled to the harness. In at least one embodiment, the modular pouch may be attached to pouch loops in the harness. The modular pouches enable the harness to be customized for a variety of applications. For instance, the modular pouches may be configured to have one or more pockets that may be closable with a variety of connectors.

In another embodiment, the harness may include a non-binding shoulder strap extending from the waist strap that enables self-extraction from the harness after a fall. In addition, the non-binding shoulder strap does not crush a user's chest during a fall. The shoulder strap may be formed from two straps forming an X pattern and attached to the waist strap. The shoulder strap may be formed from elastic. The harness may also include a chest strap coupled to the shoulder strap and configured to extend around a chest of a user. A slider loop may be coupled to the chest strap to retain the chest strap relative to the shoulder strap yet permit a fastener on the shoulder strap to slide through the slider loop yet. The harness may also include at least one nonmetallic loop, which may be formed from a webbing strap, coupled to the waist strap and configured to receive a fastener. The harness may also include a climbing strap configured to extend from the seat around a support structure and be releasably coupled to the nonmetallic loop on the seat to secure the harness to the support structure. An adjuster buckle may be coupled to the climbing strap, and a quick release strap may be coupled to the adjuster buckle.

The harness may also include a harness support receiver extending from the waist strap at a back of the seat. The harness support receiver may be a loop or other appropriate structure. The harness may also include a fall restraint device configured to attach the seat to a support structure. The fall restraint device may include a force dissipating member. The force dissipating member may be formed from an elasticized cord, such as, but not limited to, a length of bungee material, and may include a plurality of S-folds forming a serpentine shape. The force dissipating member may also include a turn formed between the plurality of S-folds and a first end connector, wherein the turn is attached to a strap extending between the plurality of S-folds and a second end connector opposite the first end connector. The first end connector may be a lockable carabiner, and the second end connector may be a loop. The plurality of S-loops may be enclosed in a bag that is configured to open during a fall. This unique configuration enables the force dissipating member, in particular, the S-folds, to be positioned off-line. In doing so, the length of the force dissipating member to be lengthened as needed without changing the effective length to the user, thereby not increasing the force imparted to a user during a fall. This is critical to preventing injury to a person seated in the harness.

An advantage of this harness is that that harness is configured to allow a person using the device to adjust the height at which the seat is positioned while hanging from a support device without detaching the harness from a tree or other support object, thereby eliminating the possibility of the person falling from the tree while adjusting the height of the seat.

Another advantage of this harness is that the harness includes a waist strap for securing the seat around the waist of a person. Moreover, the waist strap is adjustable while the harness is suspended in a tree without requiring the person to release the waist strap and be exposed to the danger of falling from the harness.

Yet another advantage of this harness is that the connection devices may be coated with a resilient material for eliminating metallic sounds, which spook game animals, and for protecting the connection devices from damaging effects of rain and the like.

Still another advantage of this harness is that the harness includes a climbing strap for preventing a person from falling from a tree while climbing a tree or while attaching the hanging strap to the tree.

Another advantage of this harness is that the climbing strap is adjustable and capable of accommodating people and trees of many sizes. In at least one embodiment, the climbing strap is advantageously designed such that the size of the climbing strap may be adjusted on both sides enabling the user to choose placement of the hardware.

Yet another advantage of this harness is that it may include one or more loops for holding gear while using the harness. The loops also enable each user to adjust a harness to accommodate the specific needs of a user. In addition, pouches, which may be adapted for specific uses, may be attached to the waist loops and may be positioned in convenient locations around the entire outer perimeter of a harness.

Another advantage of this harness is that the harness may be customized by attaching or removing modular pouches to the harness as needed. Thus, the harness need not be manufactured for one particular use. Rather, the harness may be modified by a user to match more than one particular task.

Still another advantage of this harness is that harness may include a shoulder strap that may accomplish at least two objectives. First, the shoulder strap may support a portion of the weight of the harness system when the harness is fastened to a waist of a user. Second, the shoulder strap may act as a safety restraint in preventing a user from falling out of the harness when the user is suspended by the harness.

Another advantage of this invention is that the shoulder harness may be adjustable such that the shoulder harness may be tightened against the shoulders of a user and may be adjusted around the chest of a user.

Yet another advantage of this invention is that the shoulder harness may be adjustable with a fastener located proximate to a backside of a user such that the fastener does not interfere with tasks performed by a user supported by the harness.

Another advantage of this invention is that the harness system may be made to be very lightweight and more comfortable to be used in hot climates. For instance, at least one embodiment of the harness system may be as light as about one and one half pounds.

Still another advantage of this invention is that that shoulder harness may be integrated in a vest attached to the tree saddle.

Another advantage of this invention is that the harness system may be integrated with coveralls.

Yet another advantage of this invention is that the harness system may be used as a fall arrest system such that a hunter, or other person, may stand in a tree or on a platform, such as a tree stand, and be prevented from falling to the ground.

Another advantage of this invention is that the harness system may facilitate self-extraction from the harness in the event of a fall.

Still another advantage of this invention is that the harness system includes nonmetallic attachment loops for silently attaching straps to the seat and for quiet movement once attached.

Another advantage of this invention is that the climbing strap includes a quick release strap for facilitating easy loosening of the climbing strap.

Yet another advantage of this invention is that the fall restraint device enables a user to move relative to the support object to which the user is attached and enables the user to feel resistance from the fall restrain device before a fall event. Therefore, the fall restraint device may be used to help a user to regain his balance.

Another advantage of this invention is that the fall restraint device is configured such that as many S-folds as desired may be included within the force dissipating member without increasing the effective length of the fall restraint device. This is very important because the longer the effective length of the fall restraint device between the end connectors attaching the harness to a support object and a connector attached to the harness, the greater the inertial energy developed during a fall and the greater the force imparted onto a user in the harness. Thus, maintaining the fall restraint device as short as possible is very important for the safety of the user.

These and other features and advantages of the present invention will become apparent after review of the following drawings and detailed description of the disclosed embodiments.

BRIEF DESCRIPTION OF THE DRAWINGS

The accompanying drawing, which is incorporated in and form a part of the specification, illustrate preferred embodiments of the presently disclosed invention(s) and, together with the description, disclose the principles of the invention(s). These illustrative figures include the following.

DETAILED DESCRIPTION

Figure 1:
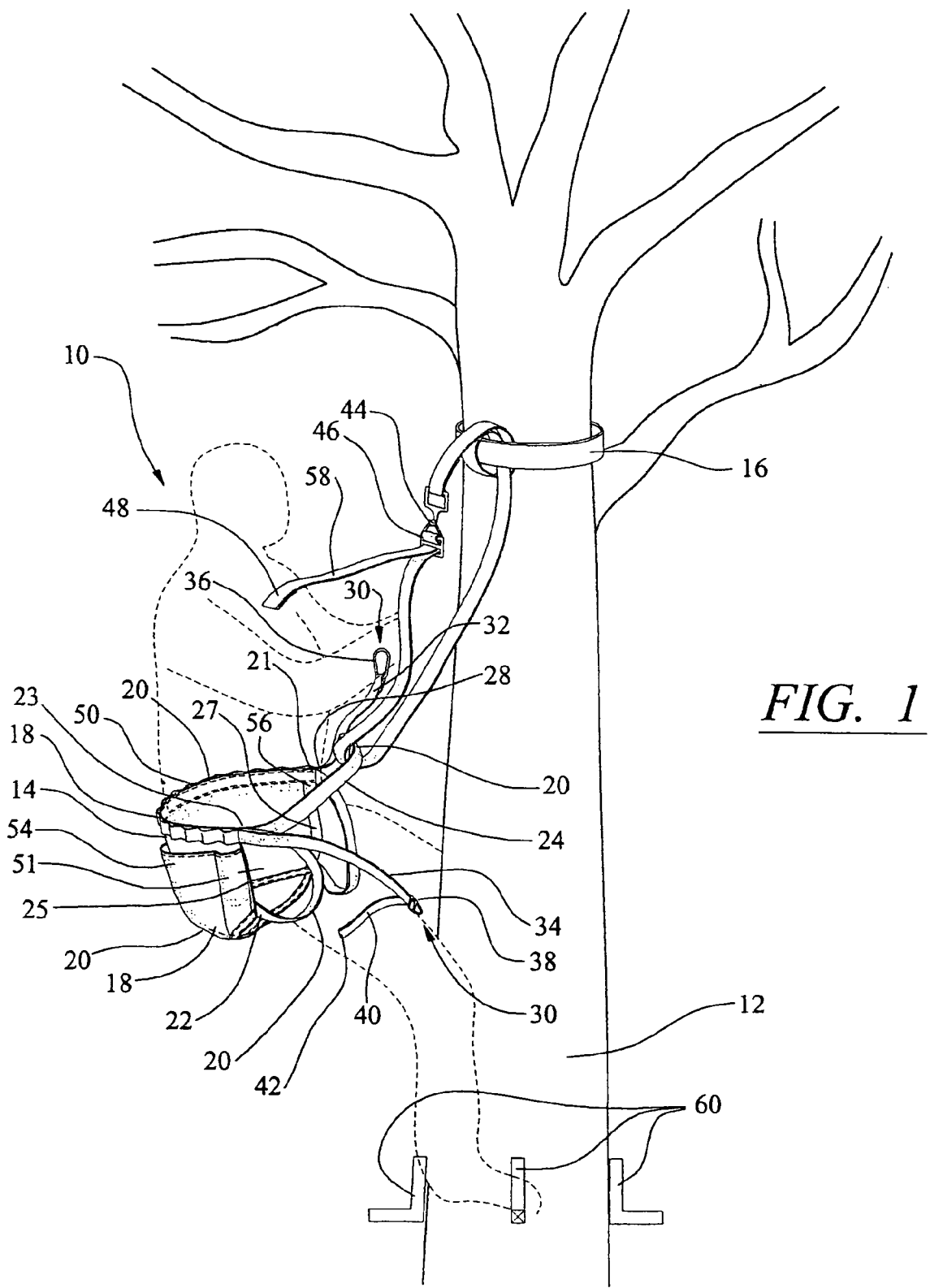
FIG. 1 is side perspective view of a harness according to one or more aspects of this invention.
Figure 2:
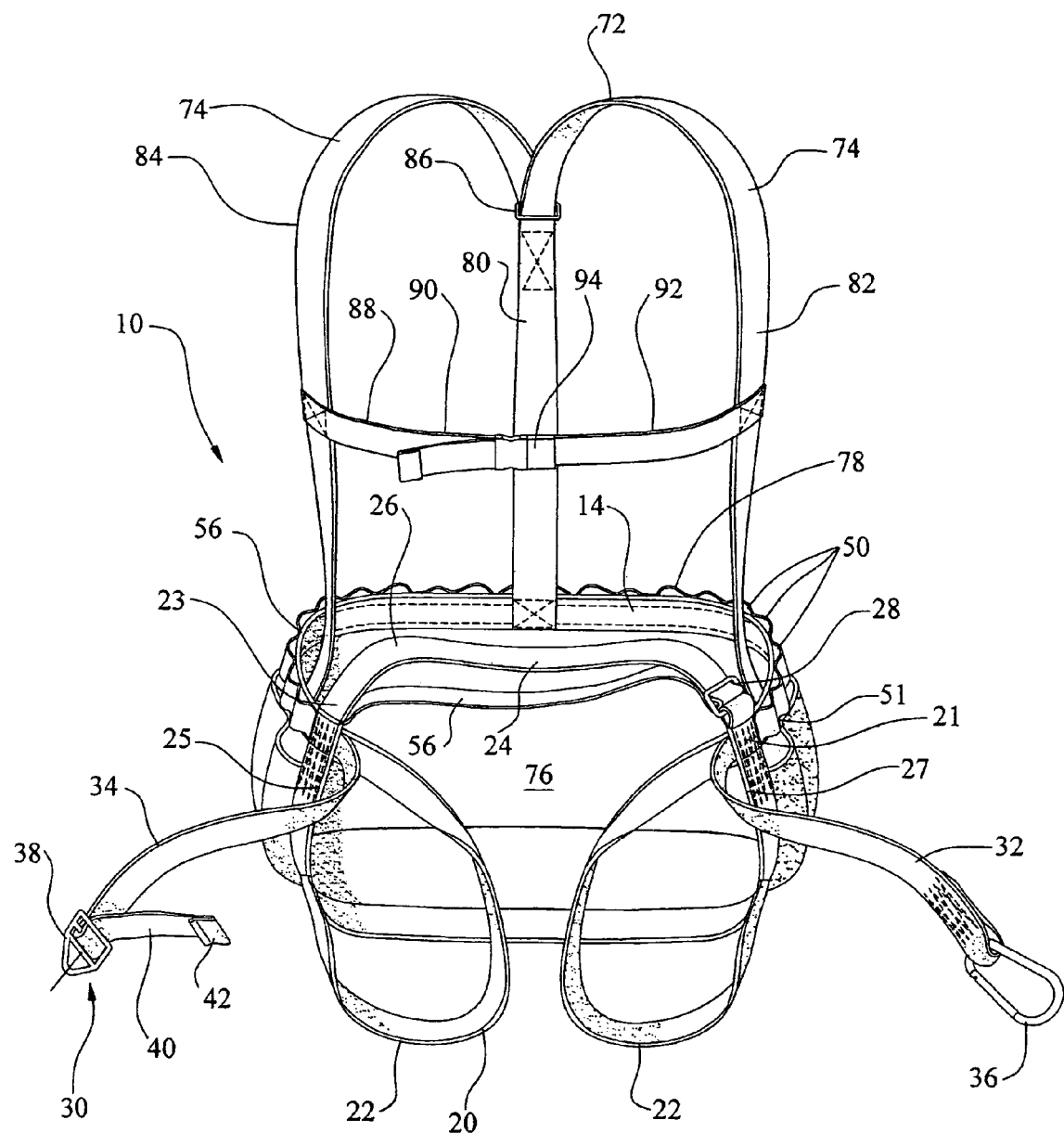
FIG. 2 is a frontal perspective view of the harness shown in FIG. 1.

FIGS. 1 and 2 illustrate a harness 10 capable of supporting a person off of a ground surface by hanging from a support object 12. Support object 12 may be, but is not limited to, a tree, a building, a rope, a rock face, a telephone pole, a power pole, or other such device. Harness 10 includes a seat 14 for supporting a person and a hanging strap 16 for coupling the seat 14 to a support object 12. Seat 14 may be composed of numerous materials, such as, but not limited to, leather, nylon, CORDURA, neoprene, any combination of these materials, and other natural and synthetic fabrics and materials. Any of these materials, or other appropriate materials, may be formed into a mesh to reduce heat build up by a user. Seat 14 may be formed from a material that is substantially silent when contact such that relatively little, if not no, noise is produced when the fabric is contacted. Seat 14 is configured to fit loosely around the buttocks and hips of a person and to conform to the shape of a person. Seat 14 may have one or more sizes to accommodate small children and large adults. Seat 14 may include a first top corner 21, a second top corner 23, a first side edge 25, and a second side edge 27.

A periphery 18 of seat 14 may be supported and reinforced with a strap 20. Strap 20 may be attached to periphery 18 of seat 14 and form leg containing loops 22 that act as a safety mechanism. In at least one embodiment, leg containing loops 22 may include a first leg containing loop coupled to first side edge 25 and a second leg containing loop coupled to a second side edge 27. Leg containing loops 22 may be formed from a single strap that is also coupled to periphery 18 of seat 14. When a person is seated in seat 14, leg containing loops 22 loosely surround the legs of the person and do not restrict the person's ability to move or change positions. Leg containing loops 22 support the weight of a person if the person falls from seat 14.

Figure 4:
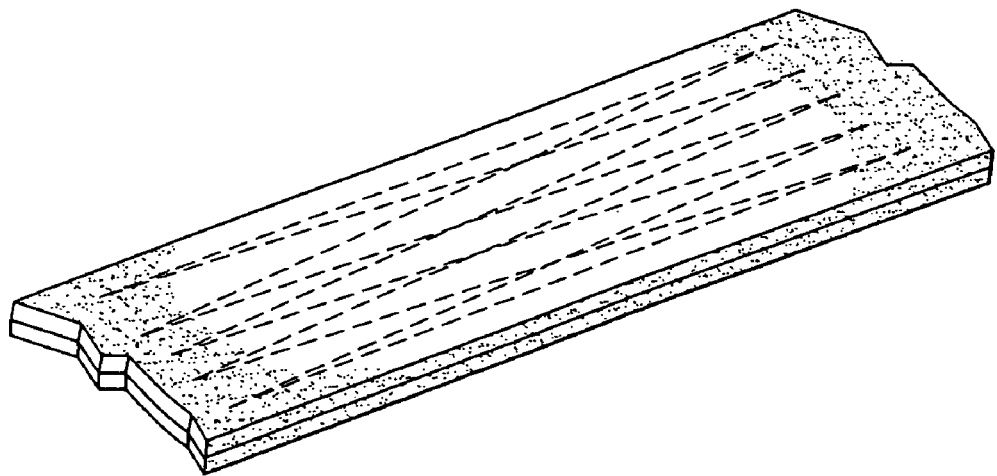
FIG. 4 is a detail of a stitch pattern.

In other embodiments, strap 20 may be composed of more than one strap. Strap 20 may be coupled to seat 14 using stitching or other attachment mechanisms. In one embodiment as shown in FIG. 4, the stitching may formed from a "WW" stitch pattern. The "WW" pattern may be about 6 inches long to secure the loose ends of strap 16 to seat 14 with maximum strength. The "WW" stitch pattern may have a minimum weight bearing capacity of about 500 pounds.

Figure 7:
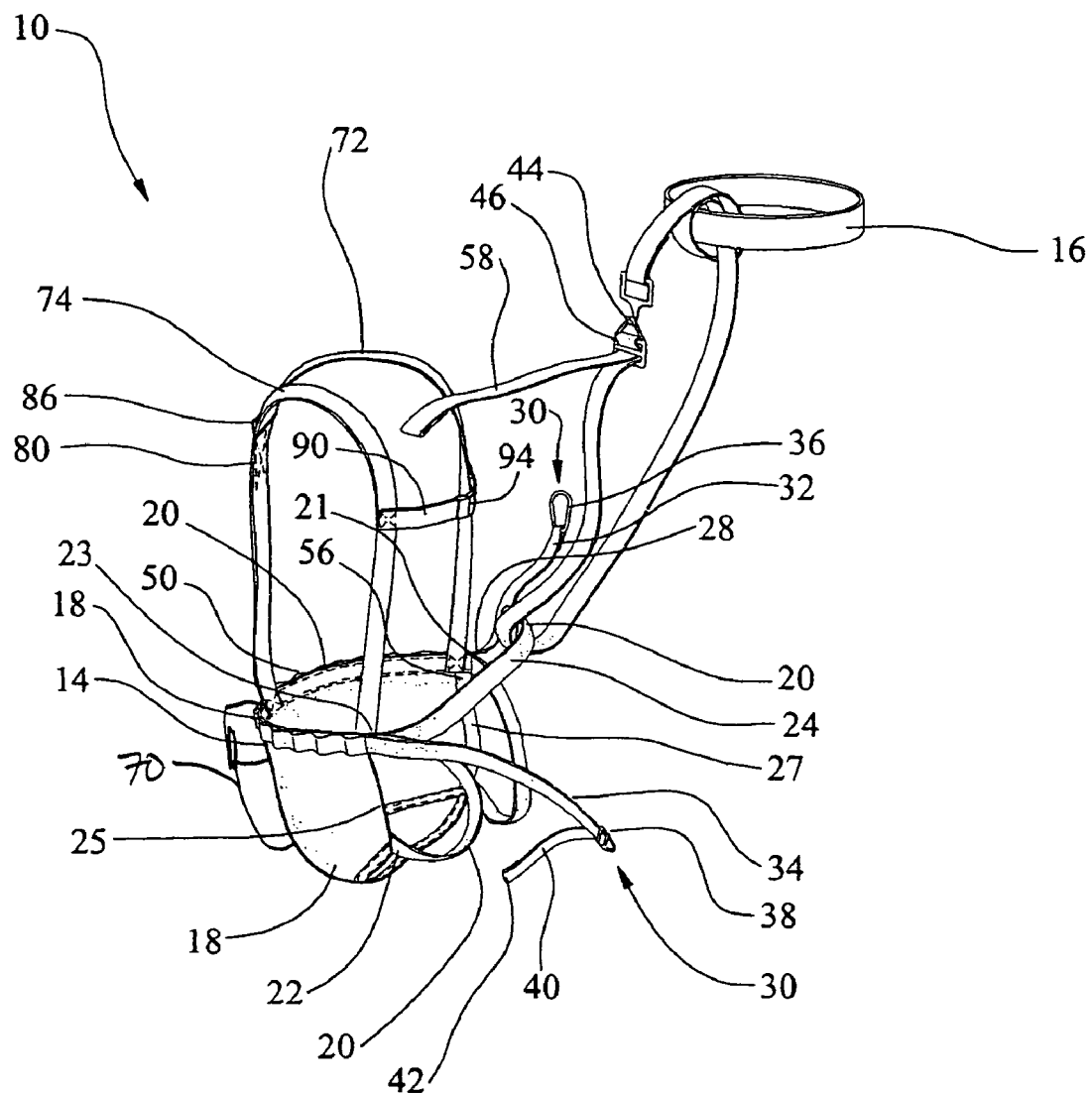
FIG. 7 is a perspective view of an alternative embodiment of the harness including a shoulder strap.

Strap 20 may provide sufficient structure to the harness 10 such that the material forming the seat 14 may be varied during the manufacturing process, as shown in FIG. 7. Strap 20 may be assembled such that replacement of seat 14 may be easily accomplished. In addition, the seat material 14 may be releasably attached to the strap 20 such that during normal operation, the seat 14 remains attached to the strap 20, but may be removed and replaced with a seat 14 made of a different material. Replacement of the seat 14 may be desired to accommodate the harness 10 to different weather conditions. During the assembly process, the strap 20 may be assembled regardless of the type of material forming the seat 14. Thus, orders may be received for different types of seat 14 materials, and the orders may be rapidly filled by simply attaching the seat 14 to the strap 20.

Harness 10 may also include waist strap 24, as shown in FIGS. 1, 2, and 7. Waist strap 24 may be formed from top strap section 26 and bottom strap section 56, as shown in FIG. 2. In one embodiment, waist strap 24 extends between top corner 21 and top corner 23. Top strap section 26 may be capable of receiving hanging strap 16 to couple harness 10 to a support object 16, and bottom strap section 56 may be capable of pulling top corners 21 and 23 of seat 14 together to secure waist strap 24 and seat 14 to a person. Top strap section 26 and a bottom strap section 56 may each have a weight bearing capacity of at least 500 lbs. In other embodiments, waist strap 24 may have other amounts of strength. Waist strap 24 can be tightened or loosened around the waist of a person by pulling top strap section 26 through fastener 28. In one embodiment, waist strap 24 is formed from overlapping layers of straps, bottom strap section 56 is capable of being fastened tightly against the waist of a person seated in seat 14 while top strap section 26 may form a loop to receive hanging strap 16 for supporting seat 14.

The lengths of top strap section 26 and bottom strap section 56 of waist strap 24 may be adjusted using fastener 28. In at least one embodiment, fastener 28 may have a load bearing capacity of at least 500 pounds and may be coated with a material, such as, but not limited plastic, rubber, or other material for noise reduction. Fastener 28 enables waist strap 24 to be adjusted without having to disconnect waist strap 24, thereby never putting the person in danger of falling from support object 12. In addition, waist strap 24 may be adjusted while waist strap 24 supports the entire weight of a person seated in seat 14. Waist strap 24 may be adjusted by pulling on top strap section 26 or bottom strap section 56 depending on whether waist strap is desired to be tightened or loosened around the waist of a person. In at least one embodiment, fastener 28 may be coupled to top corner 23 of seat 14. In another embodiment, the waist strap 24 need not be tightened against the waist of a user. Instead, the waist strap 24 may be made of even lengths of material and supported evenly by the hanging strap 16.

In at least one embodiment, a single strap may be used to form strap 20 and waist strap 24. The single strap wraps around periphery 18 of seat 14, forms leg containing loops 22 and forms top strap section 26 and bottom strap section 56 by passing through fastener 28. Using a single strap reduces the number of stitched connections to a single connection. Thus, the single strap may improve the reliability and safety of harness 10.

Figure 9:
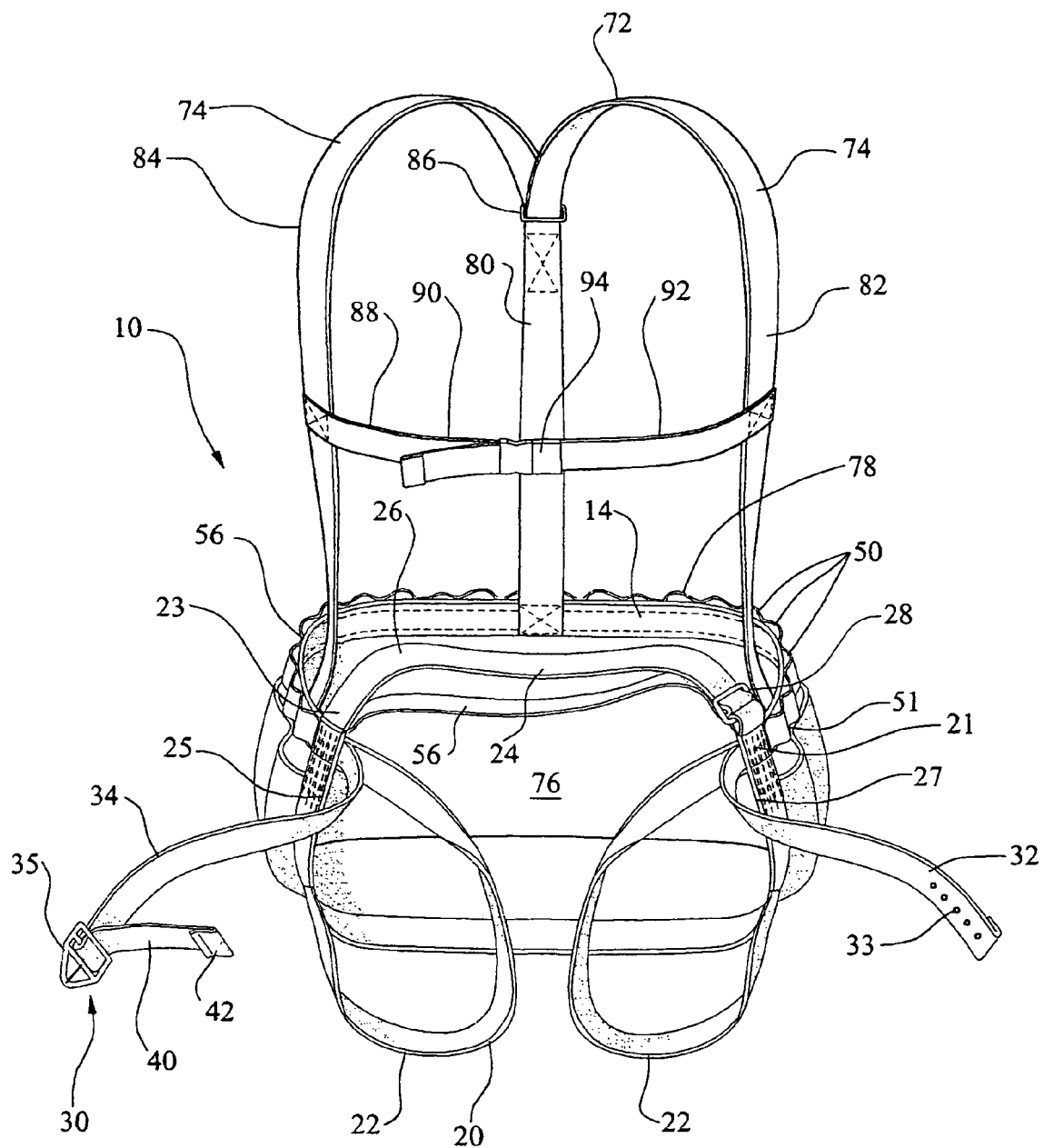
FIG. 9 is a perspective view of an alternative embodiment of the invention with an alternative connection systems for the climbing strap.

Harness 10 may further include a climbing strap 30 for assisting a person while climbing a support object 12 until the person has coupled top strap section 26 of waist strap 24 to hanging strap 16. Climbing strap 30 may be used while climbing or descending a support object 12 and while the person is attaching or detaching the hanging strap 16 to the support object 12. Climbing strap 30 may be formed from a single strap formed from a first side strap section 32 and a second side strap section 34. In other embodiments, climbing strap 30 may be formed from two or more straps. First side strap section 32 may be coupled to first side edge 25, and second side strap section 34 may be coupled to second side edge 27. First side strap section 32 may include a hook 36 sized to be received by fastener 38 that is coupled to second side strap section 34. In another embodiment, the first and second side strap sections 32, 34 may be coupled together using a plurality of adjustment holes 33 and a buckle 35, as shown in FIG. 9. The length of first side strap section 32 may or may not be adjustable. Alternatively, the length of both the first side strap 32 and the second side strap 34 may be adjustable. In an alternative embodiment, climbing strap 30 formed from a single strap may be attached to "D" rings, or other similar fasteners, attached to first top corner 21 or a second top corner 23, respectively.

In one embodiment, fastener 38 has a weight bearing capacity of about 500 pounds and may be coated with a protection material to reduce sound, such as, but not limited to, plastic, rubber or a wear resistant paint. Fastener 38 may be in the shape of a V-ring or webbing ring, which reduces noise during use. First and second side strap section 32, 34 may also have a length of three of more feet. During use, first side strap section 32 and second side strap section 34 are wrapped around the circumference of a support object 12, and fastener 38 is coupled to hook 36. The length of climbing strap 30 may then be adjusted using loose end 40. Some slack should be left in climbing strap 30 to enable a person to climb a support object 12. The climbing strap 30 may be tightened around the tree to bring a person seated in seat 14 closer to the tree by pulling on loose end 40. Climbing strap 30 may also include a stop 42, such as, but not limited to, a butterfly end stop, for preventing accidental removal of fastener 38 from climbing strap 30.

Seat 14 may be coupled to a support object 12 using hanging strap 16, as shown in FIG. 1. Seat 14 and hanging strap 16 are configured so that when a person or other object is supported by the seat 14, the center of gravity of the person is below the pivot points, where are the top corners 21 and 23 of the seat 14. As a result, the seat 14 is stable and prevents a person from flipping over in the seat 14 during use.

Figure 3:
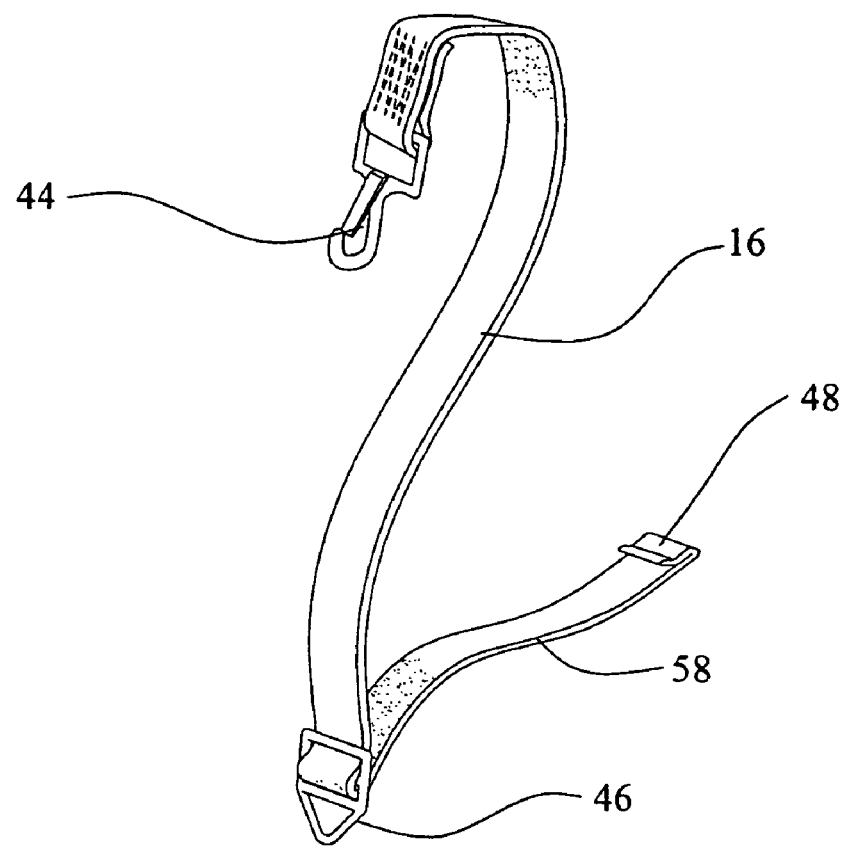
FIG. 3 is a perspective view of a hanging strap.

Hanging strap 16, as shown in FIGS. 1 and 3, may vary in length and strength, but in one embodiment, hanging strap 16 is about 12 feet long and formed from a strap having a width of about 1¾ inches and weight bearing capacity within the range between about 500 pounds to about 12,000 pounds. In other embodiments, hanging strap 16 may be shorter than 12 feet or longer than 12 feet, and, in one embodiment, may be as along as 100 feet. Hanging strap 16 may include a releasable hook 44 attached to one end and a fastener 46 slidably coupled to hanging strap 16. In one embodiment, releasable hook 44 may have a weight bearing capacity of about 500 pounds, and fastener 46 may have a weight bearing capacity within a range between about 500 pounds and about 2,500 pounds. Fastener 46 may also be coated with a protection material to reduce sound, such as, but not limited to, plastic, rubber, or a relatively wear resistant paint, or other item. Fastener 46 may be in the shape of a V-ring, which reduces noise during use.

Releasable hook 44 may be attached to hanging strap 16 by feeding hanging strap 16 through a connection ring on releasable hook 44 and coupling hanging strap 16 to itself using, for instance, stitching. In one embodiment, a stitch pattern, such as, but not limited to, a "WW" stitch pattern shown in FIG. 4, having a weight bearing capacity of between about 500 pounds to more than about 3,000 pounds may be used to secure releasable hook 44 to hanging strap 16. Hanging strap 16 may also include a stop 48 at the end of hanging strap 16 opposite the releasable hook 44 to prevent fastener 46 from being removed from hanging strap 16. Stop 48 may be, but is not limited to, a butterfly stop.

Harness 10 may also include numerous pouches 54 coupled to seat 14 for storing first side strap section 32 and second side strap section 34 of climbing strap 30 while not being used; hunting aides, such as calls, hand warmers, gloves, insect repellant, thermoses, scents, binoculars, hats, and drinks; and other such items. Pouch 54 may form a significant portion of a backside surface of the seat 14, as shown in FIG. 1. Pouch 54 may have a closure mechanism such as, but not limited to: a drawstring; a flap; a releasable, reusable attachment device such as, but not limited to, VELCRO, or a zipper; or other mechanism. Harness 10 may also include one or more side pouches 51. Side pouches 51 may have different sizes to store and protect numerous items. Side pouches 51 and pouch 54 may be composed of any durable material, such as leather, CORDURA, nylon, mesh, neoprene, or other appropriate material. The pouches 51, 54, may be formed from a material that is substantially silent when contacted.

In one embodiment, as shown in FIG. 1, harness 10 may include pouch loops 50 formed from strap 16 for receiving modular pouches 70 that may be attached to the harness 10 for holding various items, such as flashlights, pocket knives, and other items having attachment clips. Thus, the removable, modular pouches 70 may be coupled to the seat 14 by being attached to the pouch loops 50. Pouch loops 50 may be formed with generally vertical stitching forming a plurality of vertical lines spaced apart from each other. In one embodiment, pouch loops 50 may be about two inches wide. Pouch loops 50 may be formed using strap climbing strap 30 where climbing strap 30 is attached to periphery 18 of seat 14. The harness 10 may include a single pouch loop 50 or a plurality of pouch loops 50 located at an upper perimeter of the harness 10.

Figure 5:
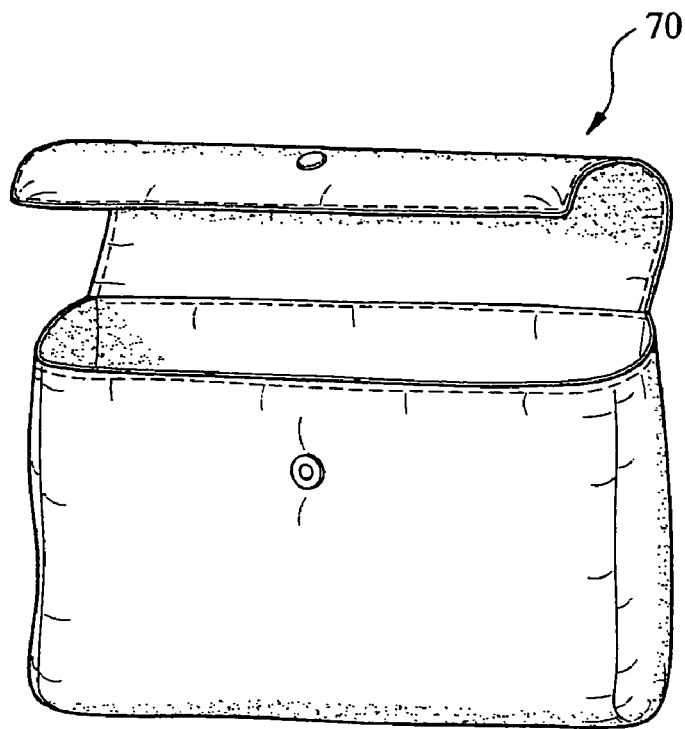
FIG. 5 is a frontal perspective view of a modular pouch of this invention.
Figure 6:
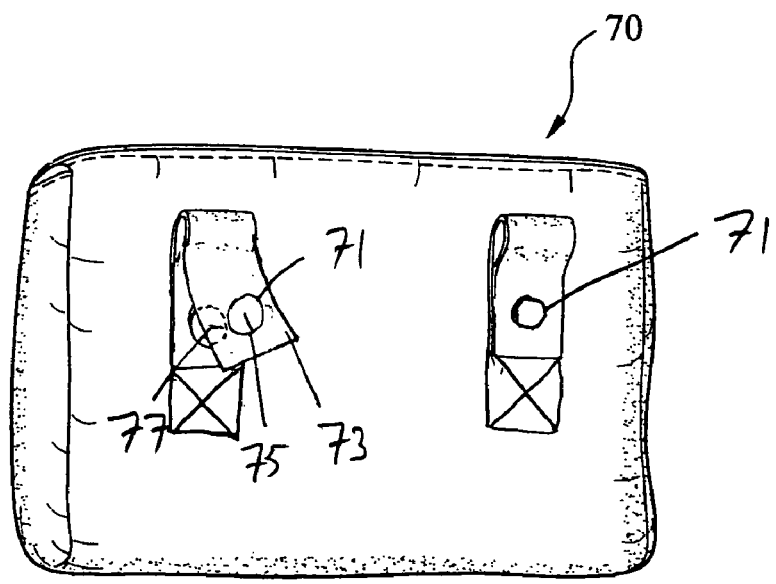
FIG. 6 is a rear perspective view of a modular pouch of this invention.

In an alternative embodiment, as shown in FIGS. 5-6, harness 10 may include one or more modular pouches 70 attached to the harness 10. The modular pouches 70 may be, but are not limited to being, releasably attached to the harness 10. The modular pouches 70 may be attached to the harness 10 using one or more of the pouch loops 50. In at least one embodiment, the modular pouches 70 may be attached to the harness 10 using snaps, zippers, hoop and loop connectors, and other releasable connection devices. The modular pouches 70 may be configured to contain a number of items. For instance, when the harness 10 is outfitted for hunting applications, modular pouches may be attached to the harness 10 that are configured to hold binoculars, a thermos or water bottle, or both, game calls, insect repellant, tree steps, a tree saw, a climbing strap 30, or other items. These pouches may be referred to as a thermos pouch, a binoculars pouch, a game call pouch, a tree step pouch, a climbing strap pouch, a hanging strap pouch, and a tree saw pouch. A single modular pouch 70 may store each of these items. In another embodiment, a modular pouch 70 may hold only one item. In yet other embodiment, the modular pouch 70 may hold two or more of these items. The modular pouch 70 may have on or more openings that may be closed with a hook and fastener connector, a zipper, or other appropriate connector. In at least one embodiment, the connector may be a locking snap 71.

The locking snap 71 may be configured such that the snap 71 on the strap 73 includes a groove 75 that is positioned at a 6:00 position. A notch 77 on the modular pouch 70 may be positioned in a 3:00 position. The snap 71 may be locked by lining up the groove 75 with the notch 77, snapping the snap 71 together and rotating the snap 71 back to the 6:00 position to lock the snap 71 to prevent accident opening of the modular pouch 70.

Should the harness 10 be needed to be used for an application other than for hunting, the modular pouches 70 may be removed and replaced with modular pouches 70 having other configurations accepting other items. The modular pouches 70 may also be removed from the harness 10 and not replaced. There may be situations in which the harness 10 may be used without a modular pouch 70 in order to reduce the weight of the harness 10 or to be used for an application in which the modular pouches 70 may interfere with an activity or are unnecessary.

The modular pouches 70 may be formed from a variety of materials. Some applications may include use of a waterproof material, such as neoprene or others. Other applications may include use of a fabric that is breathable or ventilated, such as nylon mesh and others. In other applications, the modular pouches 70 may include drainage holes. The harness system 10 may be made to be extremely lightweight, such as only about two pounds, in embodiments where the modular pouches 70 and the seat 14 are formed from vented materials. Such lightweight embodiments enable the harness 10 to be used in a wider variety of applications and are particularly well suited for use in hot climates.

The harness 10 may also include a shoulder strap 72, as shown in FIG. 2. The shoulder strap 72 may be used to transfer at least a portion of the weight of the harness 10 to the shoulders of a user. The shoulder strap 72 may also be used as a safety device to prevent a person to which the harness 10 is attached from falling out of the harness 10 in the event the person is turned upside down while being suspended by the harness 10. In fact, use of the shoulder strap 72 with the harness has qualified the harness 10 for classification as a fall arrest system with the Treestand Manufacturers' Association (TMA). The shoulder strap 72 may be any device capable of preventing a person from falling from the harness 10. In at least one embodiment, as shown in FIG. 2, the shoulder strap 72 may be a formed from a Y-shaped web, an H-shaped web, an X-shaped web, or other appropriate configuration forming a loop 74 above the seat 14. The loop 74 may be formed by the shoulder strap 72 extending from a frontside 76 of the harness 10 over one or more shoulders of a user and attached to a backside 78 of the harness 10. The Y-shaped shoulder strap 72 may be formed from a single web 80 coupled to the backside 78 of the harness 10 and two webs 82 and 84 extending from the backside web 80, over the shoulders of a user, to the frontside 76 of the harness 10. The shoulder strap 72 may be attached to the harness 10 through webbing loops, which are similar to pouch loops 50, on the seat 14. The shoulder strap 72 may be detachable.

A fastener 86 may be used to adjust the size of the loop 74. In at least one embodiment, the fastener 86 may be coupled to the web 80 on the backside 78 of the harness 10, rather than on the frontside 76 of the harness 10 to eliminate any interference that may be caused by the fastener 86. For instance, by locating the fastener 86 on the backside 78, the fastener 86 is not in position to interfere with operation of a bow and arrow, such as with a bow string when a bow is drawn, use of a firearm, use of tools, or other operations. Thus, safety is not compromised and noise is kept at a minimum with the shoulder strap 72. One end of the web 80 may be secured to the harness 10 and another end passed through the fastener 86, which enables the size of the loop 74 to be adjusted. The shoulder strap 72 may be secured snuggly around the chest of a user with the fastener 86.

Webs 82 and 84 of the shoulder strap 72 may be controlled using a chest adjustor 88. The chest adjustor 88 may be formed from any device capable of controlling the position of webs 82 and 84. In at least one embodiment, the chest adjustor 88 may be formed from a two straps 90, 92 coupled together with a releasable connector 94. The length of the straps 90, 92 may be adjusted at the releasable connector 94.

Figure 8:
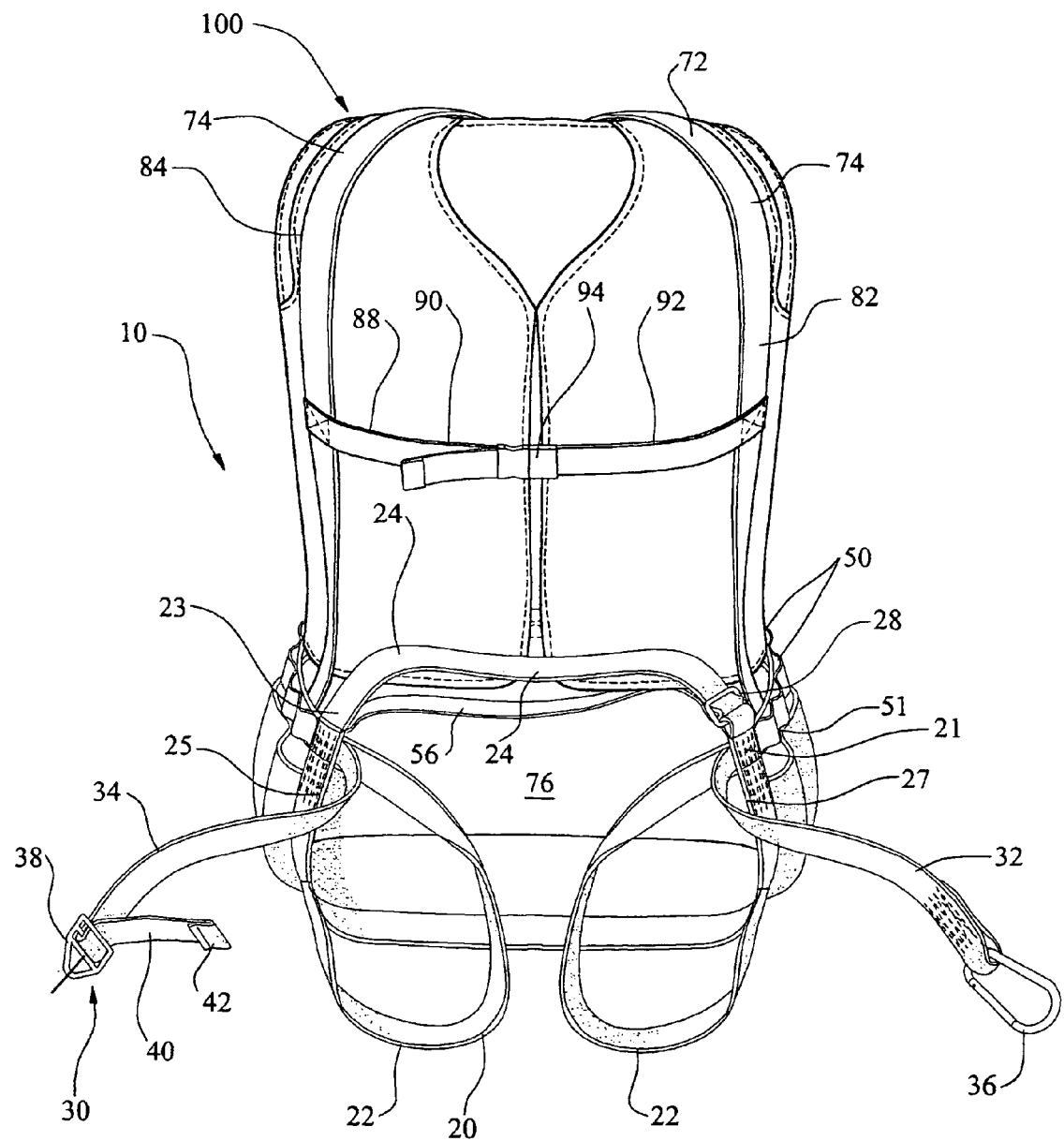
FIG. 8 is a perspective view of an alternative embodiment of the invention in which the shoulder straps are integrated with a vest.

In an alternative embodiment, as shown in FIG. 8, the shoulder strap 72 may be integrated in a vest 100. The vest 100 may be sized to fit around the chest of a user. The vest 100 may be offered in different sizes to accommodate different sized users. The shoulder straps 74 may be included in the vest 100. The vest 100 may or may not be a flotation device.

Figure 10:
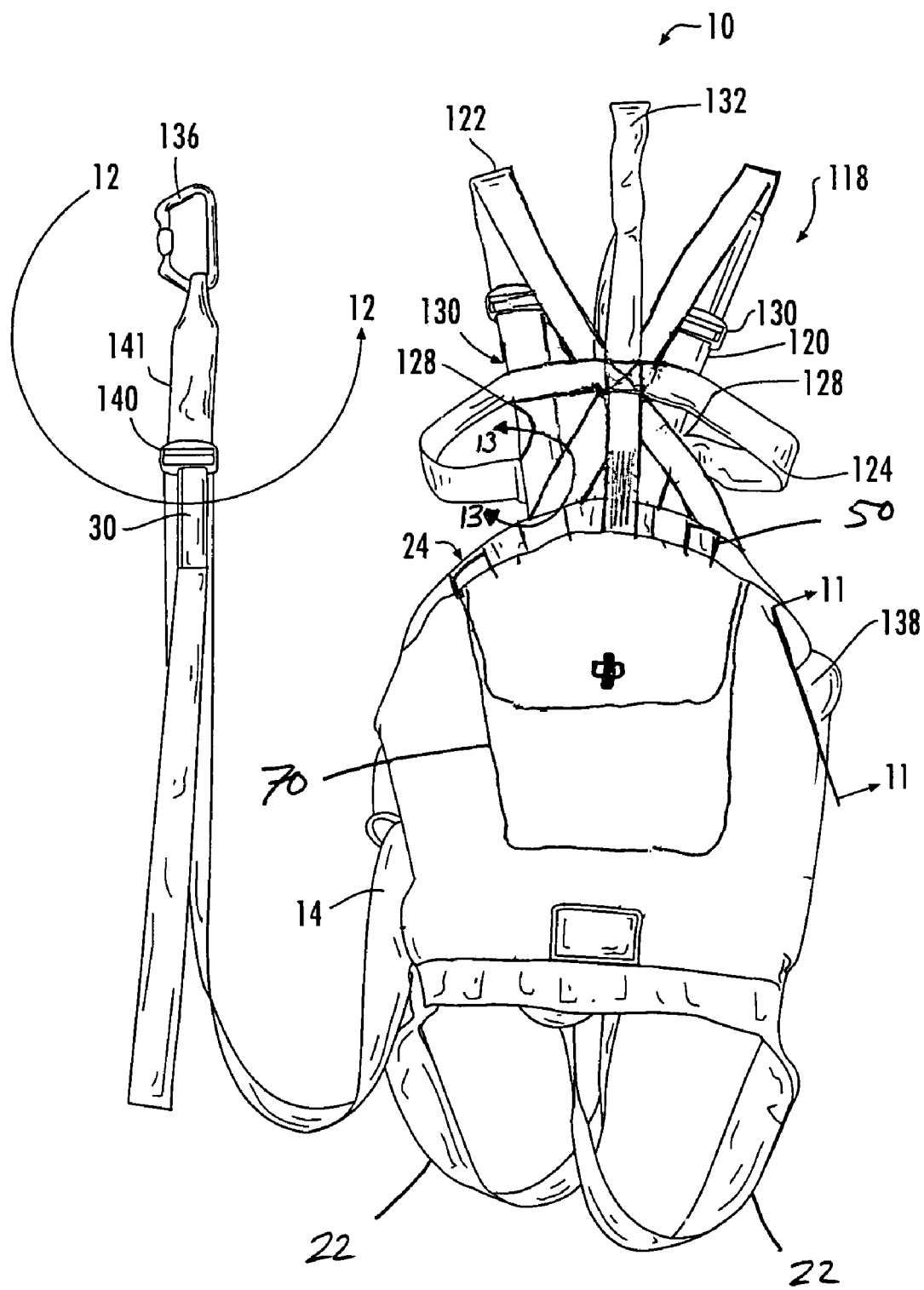
FIG. 10 is a rear perspective view of an alternative embodiment of the harness having a non-binding shoulder strap, a chest strap, a harness support receiver, nonmetallic attachment loops and other components.

In yet another alternative embodiment, as shown in FIG. 10, the shoulder strap 118 may be formed from two straps 120, 122 that form an X-shaped configuration. The straps 120, 122 may be attached to the waist strap 24 at two points of attachment. The straps 120, 122 may be formed from materials, such as, but not limited to, an elastic material and other appropriate materials. The shoulder strap 118 may be non-binding such that self-extraction is possible. In other words, a user may extract the himself from the harness 10 while suspended in the harness after a fall.

In at least one embodiment, the straps 120, 122 may be formed from an elastic web having a width of about one inch. The elastic web enables the shoulder strap 118 to be non-binding. Use of straps 120, 122 enables the harness 10 to be certified as a fall arrest system by the TMA, yet also enable a person using the harness 10 to easily extract himself from the harness 10. In particular, the harness 10 has been subjected to a battery of tests and performed better than the minimum standards in all tests. In particular, the harness 10 was tested according to the a Maximum Arrest Force Test in which a headless, armless, and legless torso replica weighing 220 pounds is positioned in the harness 10 and dropped. The maximum allowable arrest force is 1,800 pounds. The configuration shown in FIG. 19 had a maximum arrest force of about 1,300 pounds, and the configuration shown in FIG. 21 had a maximum arrest force of about 964 pounds. A graphical display of the maximum arrest force is shown in FIG. 22. The harness 10 was also subjected to a dynamic drop, which is a feet first drop with added weight, a face first drop, which tests the harness 10 for strength and ability to secure a user in the harness, and a climbing belt test, which tests the strength of the climbing strap 30 on a pass/fail basis of maintaining in tact after sustaining a drop from the maximum length of the climbing belt, which was seven feet in the test. Conventional fall arrest systems are often very difficult for a harness user to extract himself from the harness. However, self-extraction is a necessity for hunters, who often are alone in the woods. Otherwise, a hunter is trapped hanging from a tree until help arrives, which may be days later.

Figure 18:
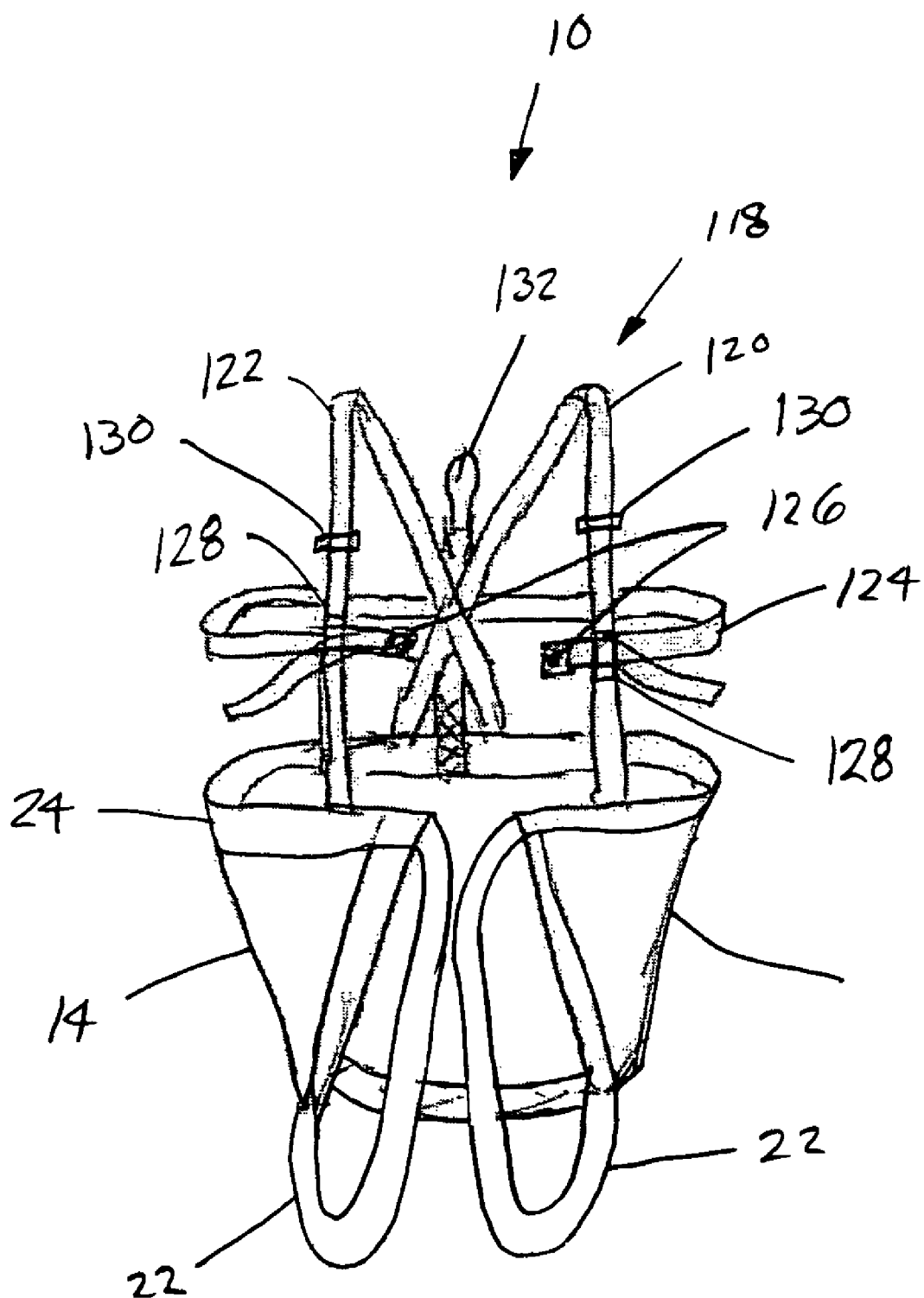
FIG. 18 is a front perspective view of the alternative embodiment of the harness shown in FIG. 10 having a non-binding shoulder strap, a chest strap, a harness support receiver, nonmetallic attachment loops and other components.

The harness 10 shown in FIGS. 10 and 18 may also include a chest strap 124. The chest strap 124 may be attached to the shoulder strap 118 in two locations. The chest strap 124 may have sufficient length to extend around the chest of a user. The chest strap 124 may include a releasable connector 126 attached to each end of the chest strap 124 to attach the chest strap 124 around the chest of a user. The chest strap 124 may also be adjustable to tighten the chest strap 124 snuggly against a user's chest. The chest strap 124 may also be made from the same material as the straps 120, 122 or other appropriate material. The elasticity of the material used to form the straps 120, 122 and the chest strap 124 may be such that the strength is sufficient to retain the user attached to the seat 14 while not crushing the chest of the user during a fall.

Figure 13:
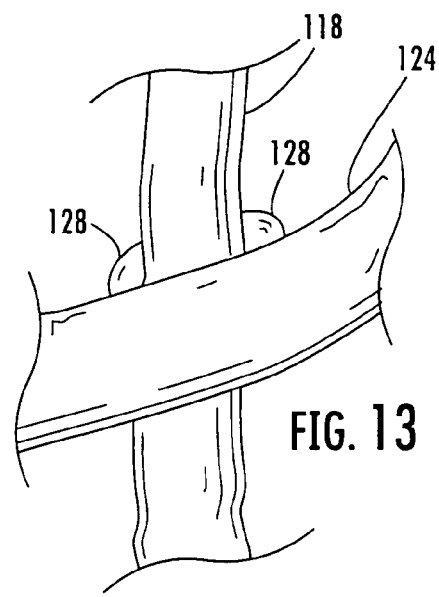
FIG. 13 is a detailed view of slider loops loosely coupling the chest strap to the shoulder straps.

The chest strap 124 may be attached to the straps 120, 122 via slider loops 128, as shown in FIGS. 10 and 13. The loops 128 may be attached to the chest strap 124 via stitching. The loops 128 may be sized sufficiently large enough to enable fasteners 130 attached to the straps 120, 122 to be passed through the loops 128. The fasteners 130 enable the straps 120, 122 to be shortened to snugly contact a user's shoulders. The fasteners 130 may be positioned on the straps 120, 122 such that the fasteners 130 are positioned proximate to the chest of a user. For small users, the fasteners 130 may be tightened by moving the fasteners through the loops 128, over the shoulders and around to the back of the user.

Figure 14:
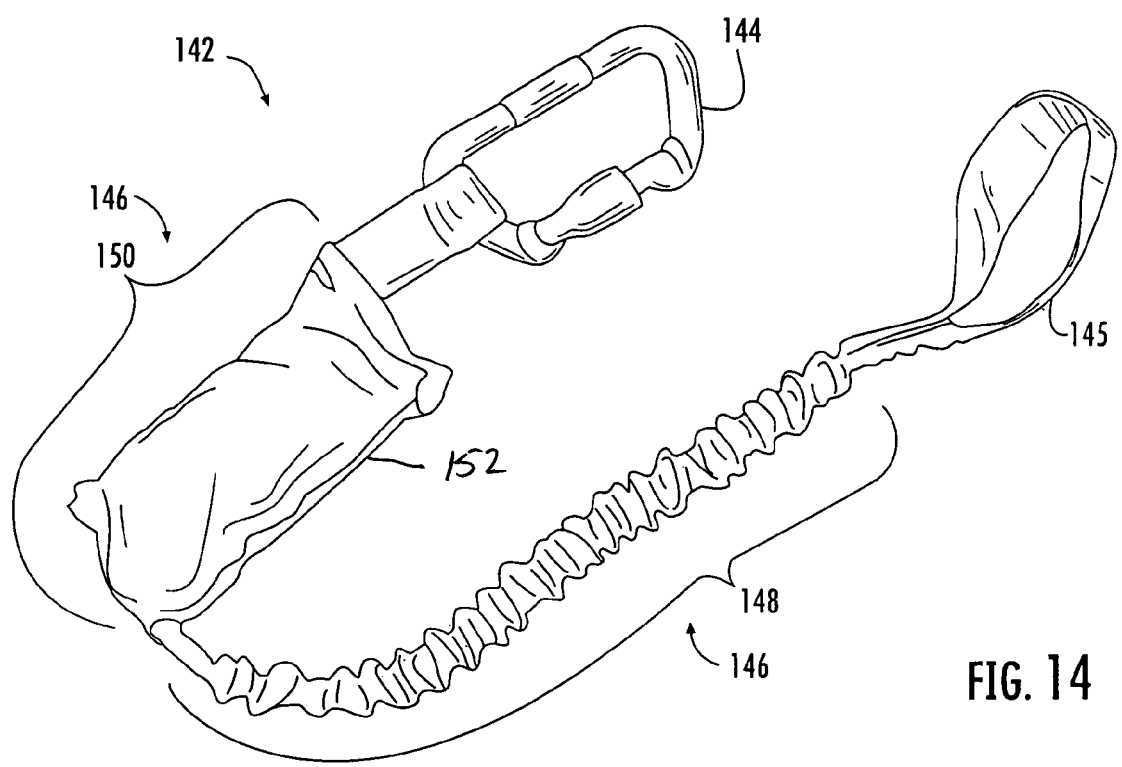
FIG. 14 is a perspective view of a fall restraint device of the harness system.
Figure 15:
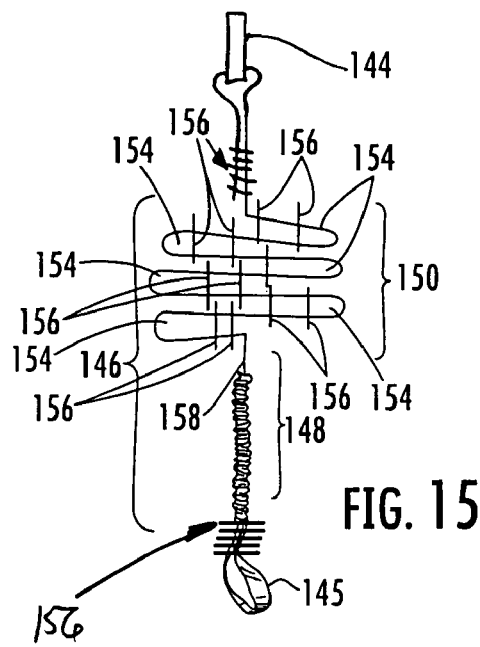
FIG. 15 is a schematic diagram of a force dissipating member of the fall restraint device.
Figure 16:
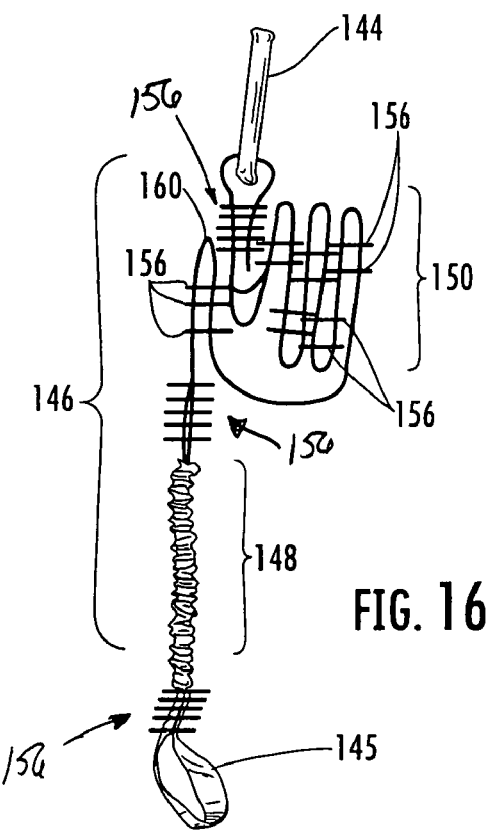
FIG. 16 is a schematic diagram of an alternative configuration of the force dissipating member of the fall restraint device.

The harness 10 shown in FIG. 10, may also include a harness support receiver 132. The harness support receiver 132 may be formed from a length of webbing formed as a loop 132 for receiving a fall restraint device 142, as shown in FIGS. 14-16. The loop 132 may be attached to the waist strap 24 and extend therefrom. The loop 132 may be attached to the waist strap 24 using the stitch pattern shown in FIG. 4. The straps 120 and 122 may be attached together with stitching and may be stitched, or otherwise attached, to the loop 132. The chest strap 124 may also be attached to the loop 132 with stitching or other attachment mechanism. In at least one embodiment, the straps 120, 122 and the chest strap 124 may be attached to the harness support receiver 132 using a box and cross stitch pattern at the center back of a user.

Figure 11:
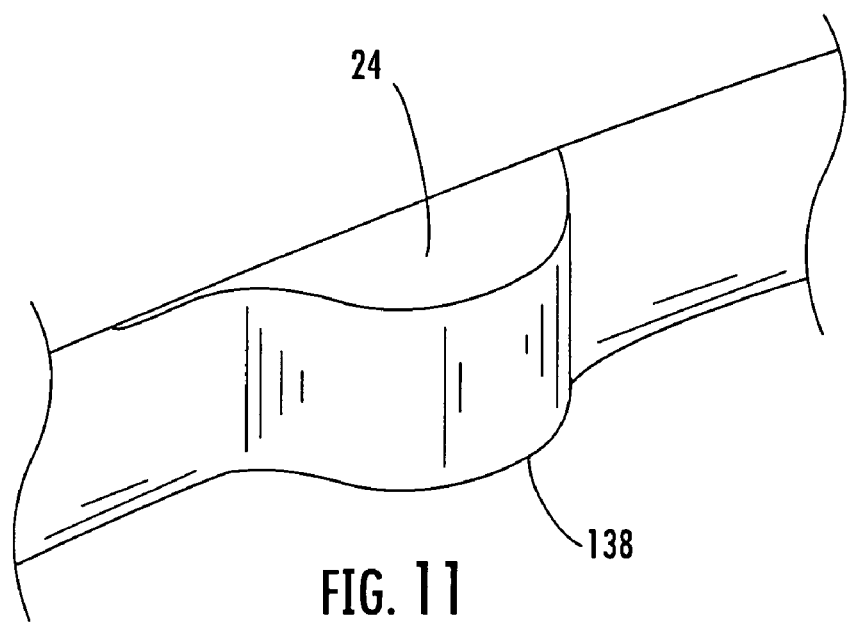
FIG. 11 is a detailed view of a nonmetallic attachment loop.

The harness 10 shown in FIG. 10, may also include a climbing strap 30. The climbing strap 30 may include a releasable connector 136 at each end for attaching the climbing strap 30 to the waist strap 24. Alternatively, the climbing strap 30 may be attached at one end to the waist strap 24 and may include a releasable connector 136 at the other end. The releasable connector 136 may be a carabiner, such as a 4,000 pound screw-lock carabiner, or other appropriate connector. As shown in FIG. 11, the climbing strap 30 may be attached to the seat 14 using nonmetallic attachment loops 138. In particular, the harness 10 may include an attachment loop 138 formed from webbing strap to prevent the releasable connector from having to be attached to metal, which would create a metal on metal connection and cause unwanted noise. Rather, the nonmetallic attachment loops 138 may be substantially silent. The attachment loop 138, in one embodiment, may be formed from a length of webbing that is about one inch wide, about ⅛ inch thick, and formed from a loop in which the webbing is about 5½ inches long and attached to the waist strap 24 with a three inch space in between attachment points, as shown in FIG. 11.

Figure 12:
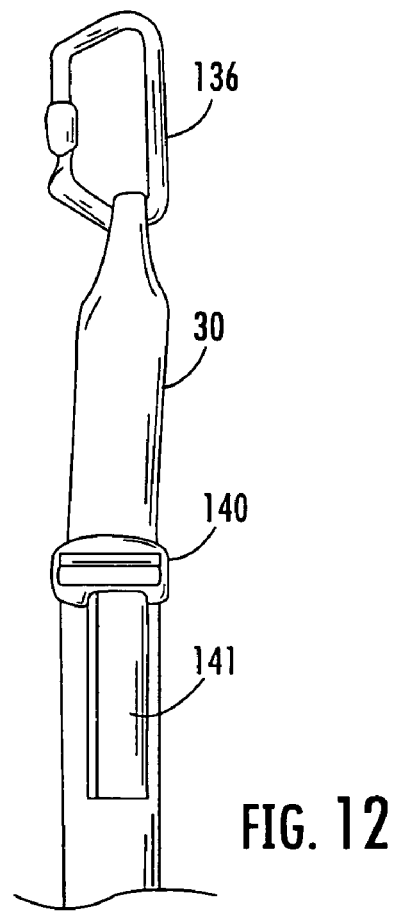
FIG. 12 is a detailed view of an adjuster buckle with a quick release strap coupled to a climbing strap.

As shown in FIG. 12, the climbing strap 30 may include an adjuster buckle 140 for adjusting the length of the climbing strap 30. The adjuster buckle 140 may include a quick release strap 141 extending from the adjuster buckle 140 for facilitating quick loosening of the climbing strap. In one embodiment, the quick release strap 141 may be used to loosen the climbing strap 30 by inverting the adjuster buckle 140 by pulling it toward a tree supporting the climbing strap. The quick release strap 141 may be any appropriate size and shape.

As shown in FIGS. 14-16, the harness 10 may also include a fall restraint device 142. The fall restraint device 142 may operate by tethering a harness to a support object, such as a tree. The fall restraint device 142 may be configured such that it is capable of supporting a human seated in the seat 14 in the event of a fall. The fall restraint device 142 is preferably sized such that the human does not fall very far before being supported by the fall restraint device 142 and is therefore prevented from developing too much energy that could cause bodily harm to the user. In one embodiment, the fall restraint device 142 may be formed from a device capable of delivering less than about 1,500 pounds of force to a user seated in the seat 14. In one embodiment, the fall restraint device 142 may be about ten inches in length, thereby permitting mobility of the user when attached yet preventing the development of potentially injury causing inertial energy at too great a level during a fall.

As shown in FIG. 14, the fall restraint device 142 may be include a releaseable connector 144, which may be a carabiner, such as a screw-lock carabiner, or other appropriate device. In one embodiment, the releaseable connector 144 may be coupled to a first end of the fall restraint device 142 for attachment to the harness support receiver 132. The releaseable connector 144 may also include a loop 145, or other appropriate connection device, at a second end opposite the first end.

The fall restraint device 142 may include a force dissipating member 146. The force dissipating member 146 may be formed from an elasticized cord 148, such as a length of bungee material, which in one embodiment may be about four inches in length. The elasticize cord enables the overall effective length of the fall restraint device 142 to be as short as possible yet enable movement by stretching the elasticized cord 148. The elasticized cord 148 may be stretched beyond the its original length, thereby permitting of a user having a harness attached to him and attached to a tree via the fall restraint device 142.

Figure 17:
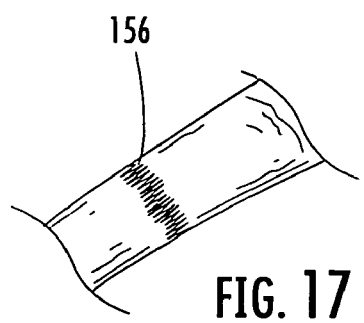
FIG. 17 is a detail view of a bar tack stitch pattern.

The force dissipating member 146 may also include a series of S-folds 150. The S-folds 150 may be formed in numerous configurations, as shown in FIGS. 15 and 16. In at least one embodiment, the S-folds 150 may be contained within a bag 152 configured such that the stitching will break during a fall to expose the S-folds 150. The S-folds 150 may be constructed such that each loop 154 is coupled together with a fastener 156, such as stitching, or other appropriate fastener. In at least one embodiment, the fastener 156 may be formed from a bar tack stitch pattern. The bar tack stitch pattern 156, as shown in FIG. 17, may be stitching that extends the width of the webbing used to form the S-folds 150, such as about ⅞ of an inch. The bar tack stitch pattern may include about 35 stitches per inch positioned in a serpentine manner. The bar tack stitch pattern may be about ¼ of an inch in width. The bar tack stitch pattern may be formed from thread, such as, but not limited to, size FF thread. The thread is preferably sized such that during a fall some of the bar tack stitching patterns break to cushion the fall of the user in the seat 14.

As shown in FIG. 14, a strap 158, which may have a width of about one inch, may extend between the elasticized cord 148 and the releaseable connector 144. The strap 158 may include a plurality of S-folds 150. The S-folds 150 may form a serpentine configuration of the strap 158. Each turn in the S-folds 150 may be formed with one or more bar tack stitches. For instance, as shown in FIGS. 15 and 16, the S-folds 150 may be formed from two bar tack stitches. In particular, one bar tack stitch may be positioned near the turn and a second bar tack stitch may be positioned near a midpoint between turns. In one embodiment, as shown in FIG. 15, the S-folds 150 may be positioned in line with the releasable connector 144 and elasticized cord 148, and the S-folds 150 may be positioned such that the strap 158 forming the S-folds 150 extend generally orthogonal to the elasticized cord 148.

In another embodiment, as shown in FIG. 16, the S-folds 150 may be positioned such that the strap 158 forming the S-folds 150 may extend generally to the side of a line extending between the releasable connector 144 and elasticized cord 148. In other words, the S-folds 150 may be positioned offline between the loop 145 and the releasable connector 144. In addition, a turn 160 of the strap 158 positioned between the S-folds 150 and the elasticized cord 148 may be attached to the strap 158 between the S-folds 150 and the releasable connector 144. The turn 160 may be formed with bar tack stitches, and the turn 160 may be attached to the strap 158 with bar tack stitches. Attaching the turn 160 in this position is very advantageous in that the S-folds 150 do not add to the effective length of the fall restraint device 142. Thus, as many S-folds 150 as necessary or desired may be added without adding to the effective length of the fall restraint device 142 between the releasable connector 144 and elasticized cord 148. Such a configuration prevents a user from developing too much energy in a fall event.

Figure 19:
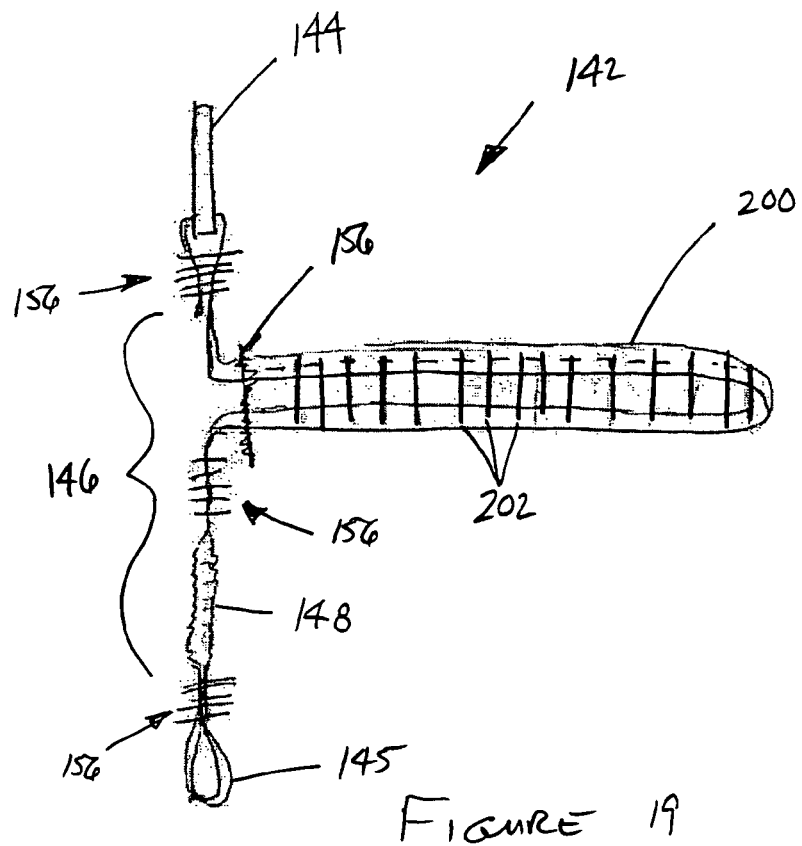
FIG. 19 is a schematic diagram of an alternative configuration of the force dissipating member.
Figure 20:
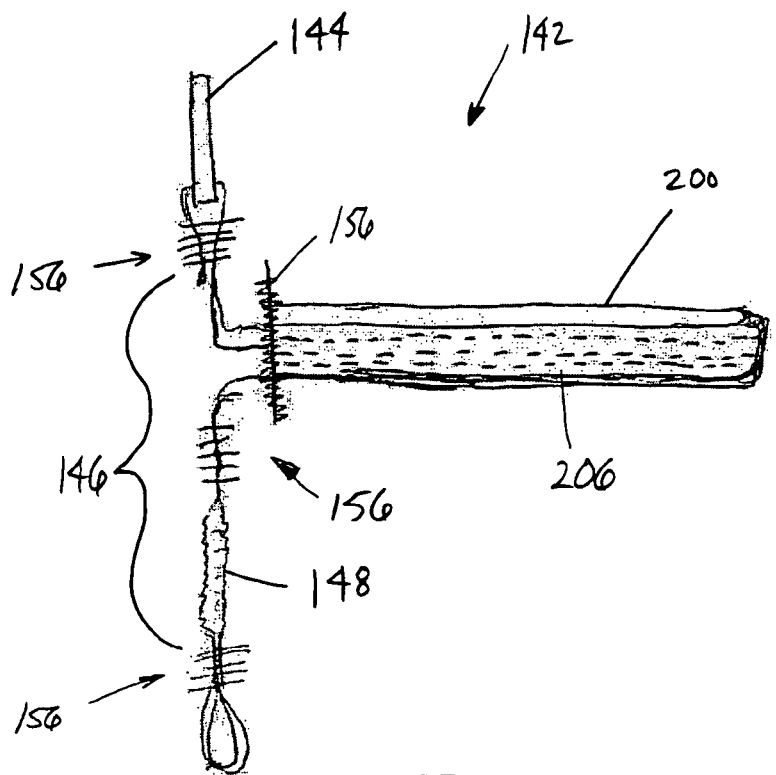
FIG. 20 is a schematic diagram of another alternative configuration of the force dissipating member.
Figure 21:
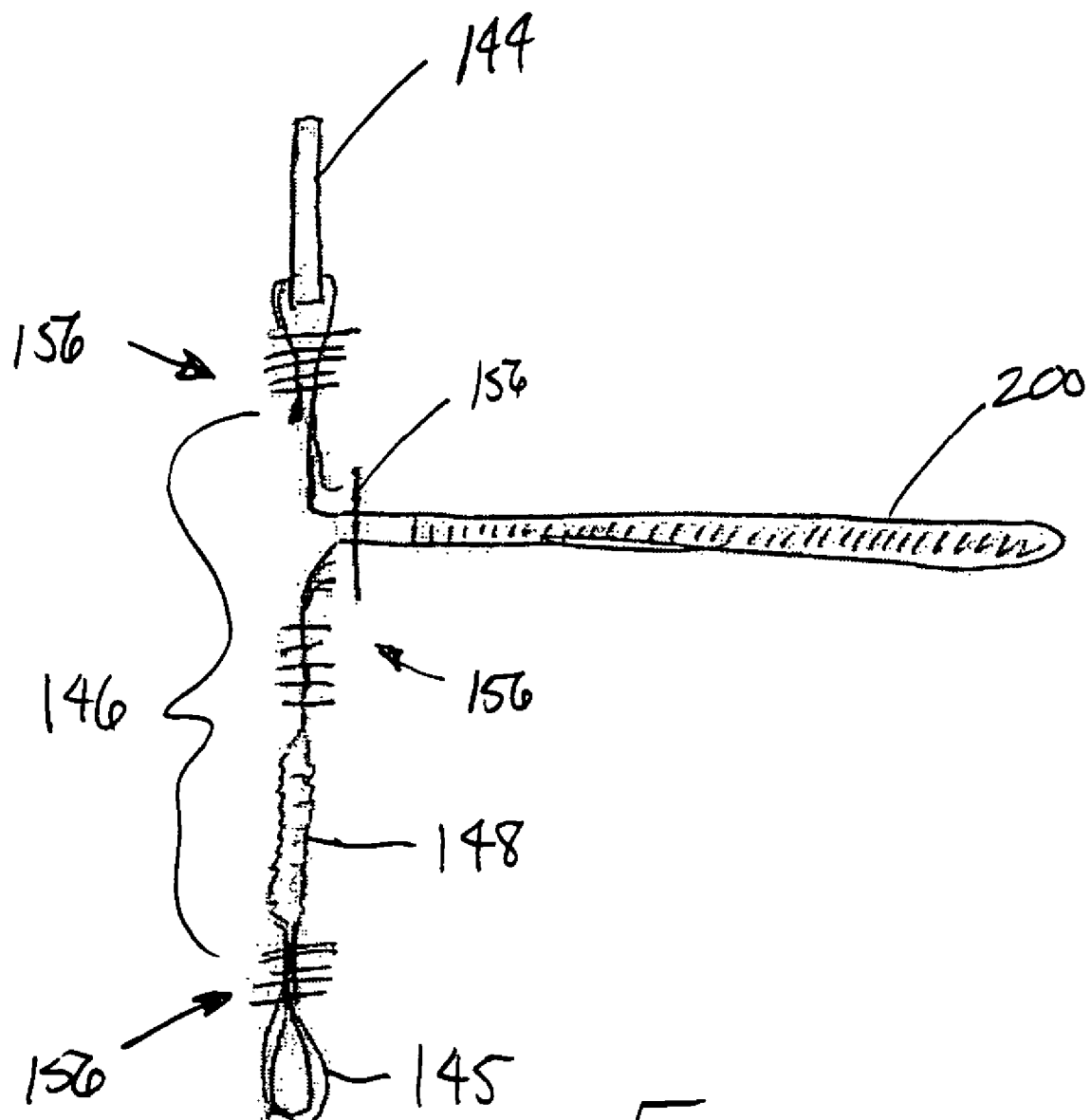
FIG. 21 is a schematic diagram of yet alternative configuration of the force dissipating member.
Figure 22:
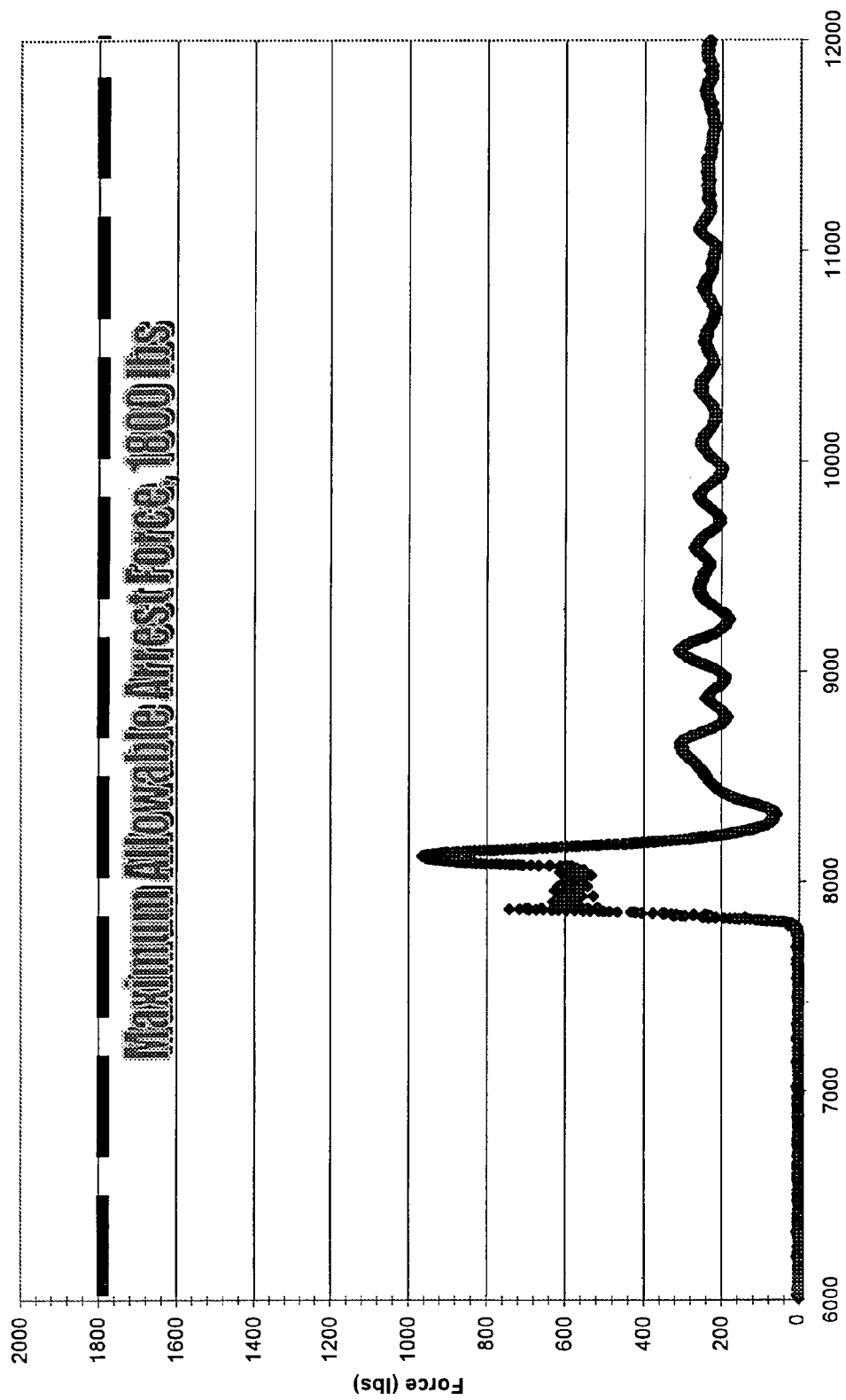
FIG. 22 is a graph of the force exerted onto user seated in the harness during a fall.

The force dissipating member 146 may be formed from other embodiments, as shown in FIGS. 19-21. As shown in FIG. 18, the force dissipating member 146 may be formed from a loop 200, which may be formed from webbing or other appropriate material. The loop 200 may be attached to a releasable connector 144, such as, but not limited to, a carabiner, with a one inch loop coupled together with five bar tack stitches 156. The opposite end of the force dissipating member 146 may be coupled to an elasticized cord 148 with five bar tack stitches 156 and may form the loop 145 with five bar tack stitches 156. The loop 200 may be formed with a bar tack stitch 156. In at least one embodiment, the loop 200 may be about 15 inches in length and formed from a length of webbing having a length of about 30 inches. The loop 200 may be sized smaller or larger depending on the application.

The loop 200 may have numerous configurations. For instance, the loop 200 may include any of the configurations shown in FIGS. 19-21, the configuration shown in FIG. 16, or combinations thereof. As shown in FIG. 19, the loop 200 may include one or more breakaway connectors 202. The connector 202 may be a bar tack stitch 156, as shown in FIG. 17, or other appropriate connector. The loop 200 may include a plurality of bar tack stitches 156 may be positioned generally parallel to each other along the length of the loop 200 and generally orthogonal to a longitudinal axis of the loop 200. As shown in FIG. 20, the loop 200 may include one or more rows of stitching 206 generally parallel to the length of the webbing forming the loop 200. The loop 200 may include three rows of stitching, as shown in FIG. 20. In one embodiment, the webbing forming the loop 200 may be formed from tubular webbing. This embodiment of stitching may create a continuous breakaway system for the force dissipating member 146. As shown in FIG. 21, the loop 21 may be formed from a double layer of webbing woven together in a manner enabling the two layers to separate in the event of a fall.

In the event a user seated in the seat 14 falls, some of the bar tack stitches break, thereby slowing down the deceleration. Slowing the deceleration reduces the forces exerted on the user and therefore, reduces the likelihood that a user will be injured from the harness 10 during a fall.

Harness 10 may be used for numerous purposes. For instance, harness 10 may be used as a tree stand for suspending hunters in a tree above the ground while hunting. The hunter may be suspended anywhere between a few feet above the ground to more than sixty feet above the ground. Harness 10 may also be used by hunters to trim the limbs from trees in the woods. Harness 10 may also be used by other people to trim limbs from trees growing in subdivisions, on golf courses, on school grounds and in other locales. Further, harness 10 may be used as a repelling harness by firefighters and other rescue personnel, high rise building window washers, electric utility workers, and others. Thus, harness 10 may be used for any purpose in which a person needs to be suspended from the ground in a safe manner while having the freedom of movement to achieve numerous tasks.

Harness 10 may be used by a person first placing harness 10 around buttocks of a person. The person may step into harness 10 by stepping through the gap between waist strap 24 and seat 14, putting a leg through each leg containing loop 22 and placing seat 14 in contact with the buttocks of the person. Waist strap 24 may then tightened using fastener 28 to secure harness 10 around the waist of the person. Adjusting the length of waist strap 24 causes the bottom strap section 56 of waist strap 24 to be tightened against the waist of the person and the top strap section 26 to form a loop with slack that is capable of being attached to hanging strap 16. The top strap section 26 may be tucked into a an elastic keeper until needed. The webs 82 and 84 forming the shoulder strap 72 may be pulled over the shoulders of the person. The shoulder strap 72 may be adjusted by adjusting the strap 72 at the fastener 86 located on the backside 78 of the harness 10. The webs 82 and 84 may be drawn together using the chest adjustor 88, which makes use of the shoulder strap 72 more comfortable. The person may then hike to his hunting location or scale a tree 12 if already beside the tree the person intends to climb. The person may climb the tree 12 in any manner possible. A common method of climbing trees is by using portable steps 60 having screws that easily screw into a tree. Portable steps 60 having other configurations may be attached to a tree 12 by wrapping a climbing strap 30 around the tree.

Preferably, before the person begins to climb the tree 12, first side strap section 32 and second side strap section 34 of climbing strap 30 are wrapped around the tree 12 and secured together using releasable hook 36 and fastener 38. The length of climbing strap 30 may be adjusted by pulling on the loose end 40 of climbing strap 30, which is proximate to stop 42. In other embodiments, the climbing strap 30 may be adjusted by placing hook 36 in an adjustment hole 33. The person may then climb the tree 12 using these portable steps 60 and limbs of the tree 12 where available until the person has reached a desired height. While climbing the tree 12, the person must guide the climbing strap 30 upward along the tree and prevent it from snagging bark during the climb. The climbing strap 30 must be momentarily disconnected to climb past limbs on tree 12. Thus, a tree that is the safest to climb with harness 10 is a tree having no branches on the trunk between the ground and the height to which the climber intends to climb. A climber climbing a tree 12 having this description will not have to disconnect climbing strap 30 until harness 10 is safely secured to the tree 12 using hanging strap 16. The climbing strap 30 is configured to be connected and disconnected using hook 36 while hugging a tree. In an alternative configuration, in which either the first or second strap 32, 34 are adjustable, the user determines placement of the hook 36 based on comfort and ease of use in a particular situation.

Once at the desired height above the ground, hanging strap 16 is retrieved from pouch and is secured to the tree 12. Hanging strap 16 may be secured to the tree 12 or tree limb in numerous manners. In one embodiment, hanging strap 16 is wrapped around the tree 12 one or more times above the person's head leaving the releasable hook 44 between about 6 and 16 inches from the tree 12. In another embodiment, hanging strap 16 is wrapped around tree 12 at least two times. The end of hanging strap 16 attached to releasable hook 44 is tied around hanging strap 16 between the tree 12 and hanging strap 16 so that releasable hook 44 hangs over the hanging strap 16 coupled to the tree 12. Fastener 46 coupled to hanging strap 16 is fed through a loop formed by waist strap 24 and attached to releasable hook 44. This forms two interlocking loops, which include: the loop formed by the waist strap 24 and the loop formed by the hanging strap 16. The interlocking loops formed by waist strap 24 and hanging strap 16 allow a person to turn easily from side to side and to face away from the support object 12 to which harness 10 is coupled. The person may now sit in seat 14 and be supported by hanging strap 16. This embodiment provides a user with increased mobility while seated in the harness 10 without compromising safety.

In yet another embodiment, a first person, who may be an experienced user, may attach the hanging strap 16 to the tree 12. A second person, who may be, but is not limited to, an inexperienced person, such as a child, may pass the hanging strap 16 through the waist strap 24 and attach the releasable hook 44 to the fastener 46 while the second person is on a ground surface. As the second person climbs the tree 12, the length of the hanging strap 16 may be adjusted.

In another embodiment, the waist strap 24 may remain tightened so that the bottom strap section 56 is tight and close to a user's waist, and the top strap section 26 forms a longer loop. The fastener 46 coupled to hanging strap 16 may be feed through a loop formed by top strap section 26 and attached to releasable hook 44; thus forming a two interlocking loops. This embodiment provides a user with an increased sense of security while seated in the harness 10 and forms the point safety harness.

The height at which the person is supported may be adjusted by pulling on adjusting end 58 of hanging strap 16. The person may either raise or lower the height at which seat 14 is positioned relative to the location at which hanging strap 16 is coupled to the tree. The height of the strap may be adjusted by the person holding the adjusting end 58 of the hanging strap 16 in one hand and the tree 12 with the other hand. The person can reduce the load on fastener 46 by holding the tree 12, thereby making the adjustment process easier when creating more distance between the seat 14 and the releasable hook 44 and the fastener 46. The person is most comfortable by adjusting the height of seat 14 so that about 60 percent of the person's weight is supported by seat 14 and the remaining 40 percent of the weight is supported by the person's feet. By enabling a climber to adjust the height of the climber's feet relative to the climber's waist, the climber can place himself in a comfortable position which is extremely important for big game hunting.

After hanging strap 1 has been attached to waist strap 24, first side strap section 32 and second side strap section 34 of climbing strap 30 may be disconnected and placed in side pouches 51, which may or may not be removable. Now, the person is free to move 360 degrees around the tree. In most situations, there may not exist enough limbs around the feet of the person to provide adequate support. In these situations, the person should position one or more portable steps 60 around the tree at the height of his or her feet when the person is in a normal or slightly elevated sitting position. Attaching steps 60 in this manner may be done after hanging strap 16 has been attached to waist strap 24 or while climbing the tree 12. These steps 60 provide the person with a platform for walking completely around the tree 12 and rotating to face the tree 12 or face directly away from the tree 12.

If the person determines that bottom strap section 56 of waist strap 24 is too tight or too loose, bottom strap section 56 may be adjusted by pulling bottom strap section 56 or top strap section 26 through fastener 28. This adjustment may be made while the person is seated in seat 14 and hanging from hanging strap 16. During the adjustment process, the user does not need to disconnect from the hanging strap 16; therefore, the safety of the user is not compromised while adjusting the waist strap 24.

The harness 10 may also be used as a fall arrest system. A user may attach the harness 10 to the user. The user may attach the fall restraint device 142 to the harness support receiver 132 extending from the waist strap 24. In at least one embodiment, the fall restraint device 142 may be about ten inches in length, thereby permitting mobility of the user when attached yet preventing the development of potentially injury causing inertial energy at too great a level during a fall. The hanging strap 16 may be wrapped around a support object, such as a tree, two or more times and secured thereto. The loop 145 of the fall restraint device 142 may be attached to the hanging strap 16 with a girth hitch or other appropriate knot. Once attached, a user is secured to the support object and prevented from falling to the ground.

The terms and expressions which have been employed herein are used as terms of description and not of limitation, and there is no intention, in the use of such terms and expressions, of excluding any equivalents of the features shown and described or portions thereof. Having thus described the invention in detail, it should be apparent that various modifications can be made in the present invention without departing from the spirit and scope of the following claims.

I claim:

1. A fall restraint device, comprising: a force dissipating member having a first end connector coupled to a first end of the force dissipating member and a second end connector coupled to a second end of the force dissipating member; wherein the force dissipating member comprises an elasticized cord coupled to a loop having at least one breakaway stitch in which the loop extends to a side of a line extending between the first end connector and the elasticized cord, the loop being offline from the line from the first end connector to the second end connector and positioned between the first end connector and the elasticized cord, wherein the loop is a strap formed with a plurality of S-folds forming a serpentine shape, wherein the strap further comprises a turn formed between the plurality of S-folds and the elasticized cord, wherein the turn is formed with bar tack or other breakaway stitches sewn into the strap, the turn extending between the plurality of S-folds and the elasticized cord and the first end connector, wherein the strap has a first end coupled to the first end connector and a second end at the turn coupled to a first end of the elasticized cord, said elasticized cord having a second end coupled to the second connector, and said plurality of S folds having additional turns.

2. The fall restraint device of claim 1, wherein the first end connector is a lockable carabiner.

3. The fall restraint device of claim 2, wherein the second end connector is a loop.

4. The fall restraint device of claim 1, further comprising a bag enclosing the plurality of S-folds.

5. The fall restraint device of claim 1, wherein each turn of each S-fold forming the plurality of S-folds is formed from stitching extending across a width of a strap and extending through two adjacent straps to form the turn of each S-fold.

6. The fall restraint device of claim 5, wherein the stitching forming each turn comprises two bar tack stitches positioned generally parallel to each other and extending generally orthogonal to the strap.

7. The fall restraint device of claim 1, wherein the at least one breakaway stitch comprises a plurality of stitches positioned generally orthogonal to the loop and generally parallel to each other.

8. The fall restraint device of claim 1, wherein the at least one breakaway stitch comprises at least one row of stitching extending generally along the loop.

9. The fall restraint device of claim 1, wherein the loop comprises a double layer of webbing woven together in a manner enabling the two layers to separate in the event of a fall.

* * * * *